March 15, 1960  G. C. ELLERBECK  2,928,597
INTERREGISTER TRANSFER DEVICE FOR CALCULATING MACHINES
Original Filed March 5, 1956  14 Sheets-Sheet 2
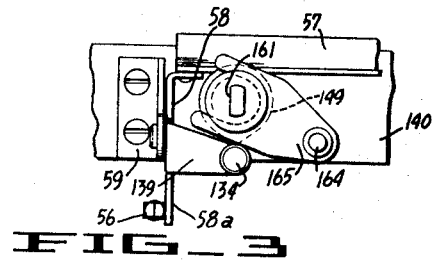
FIG_3
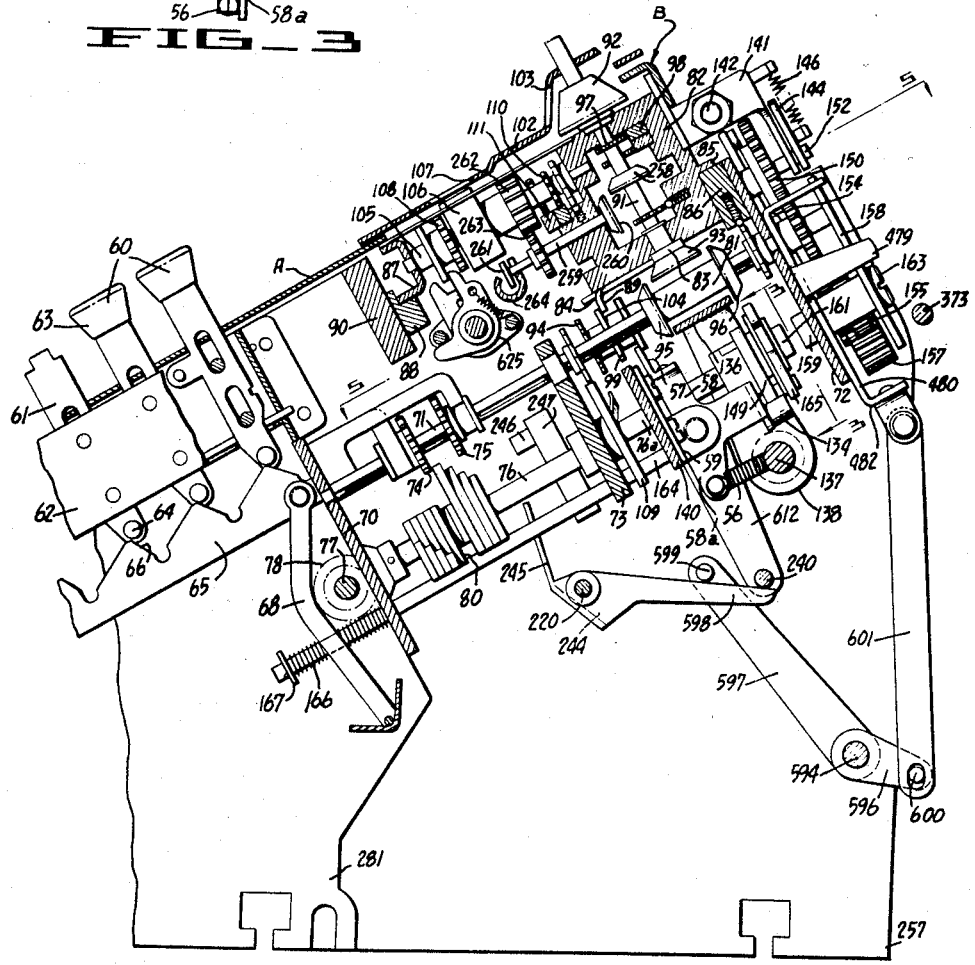
FIG_2

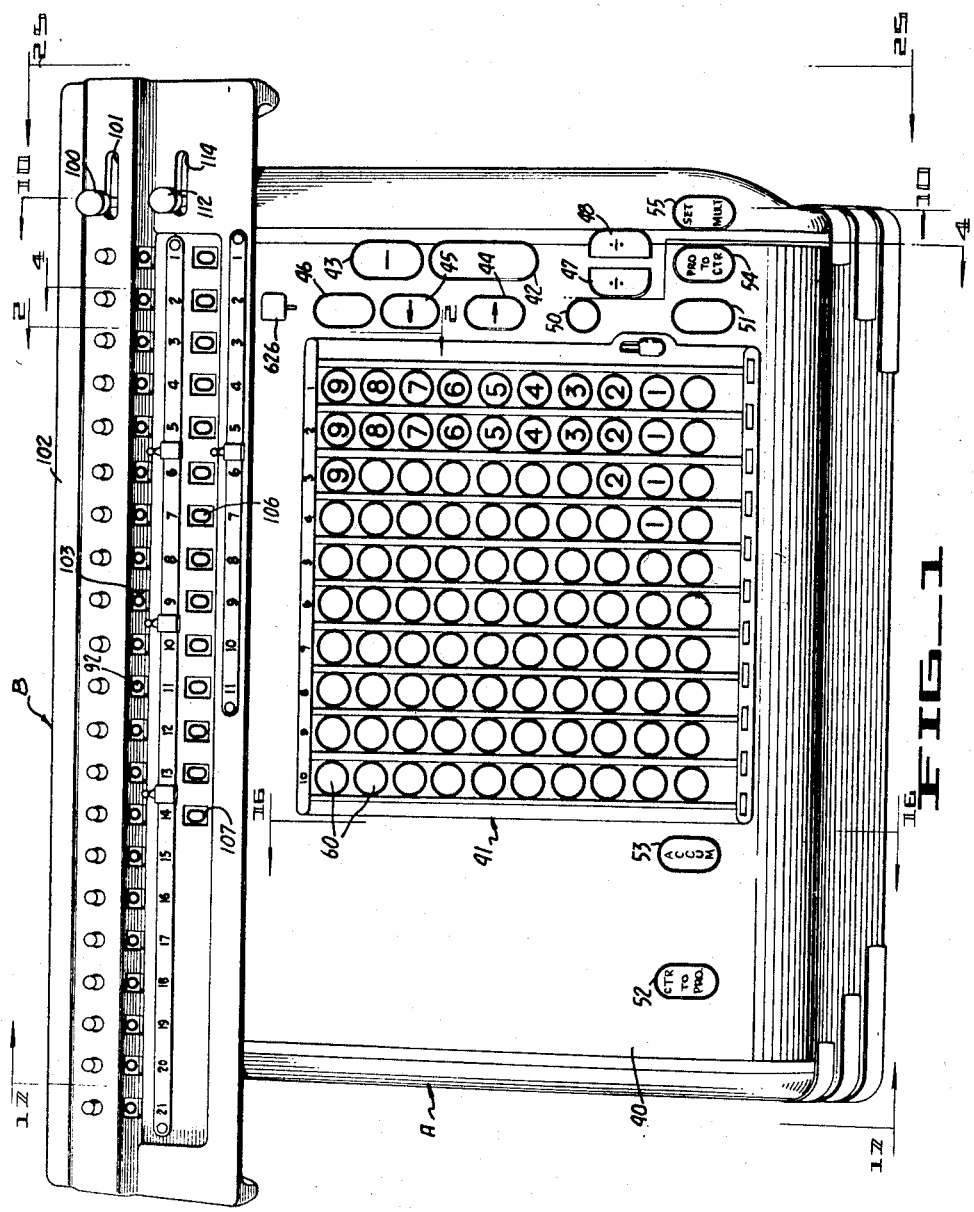

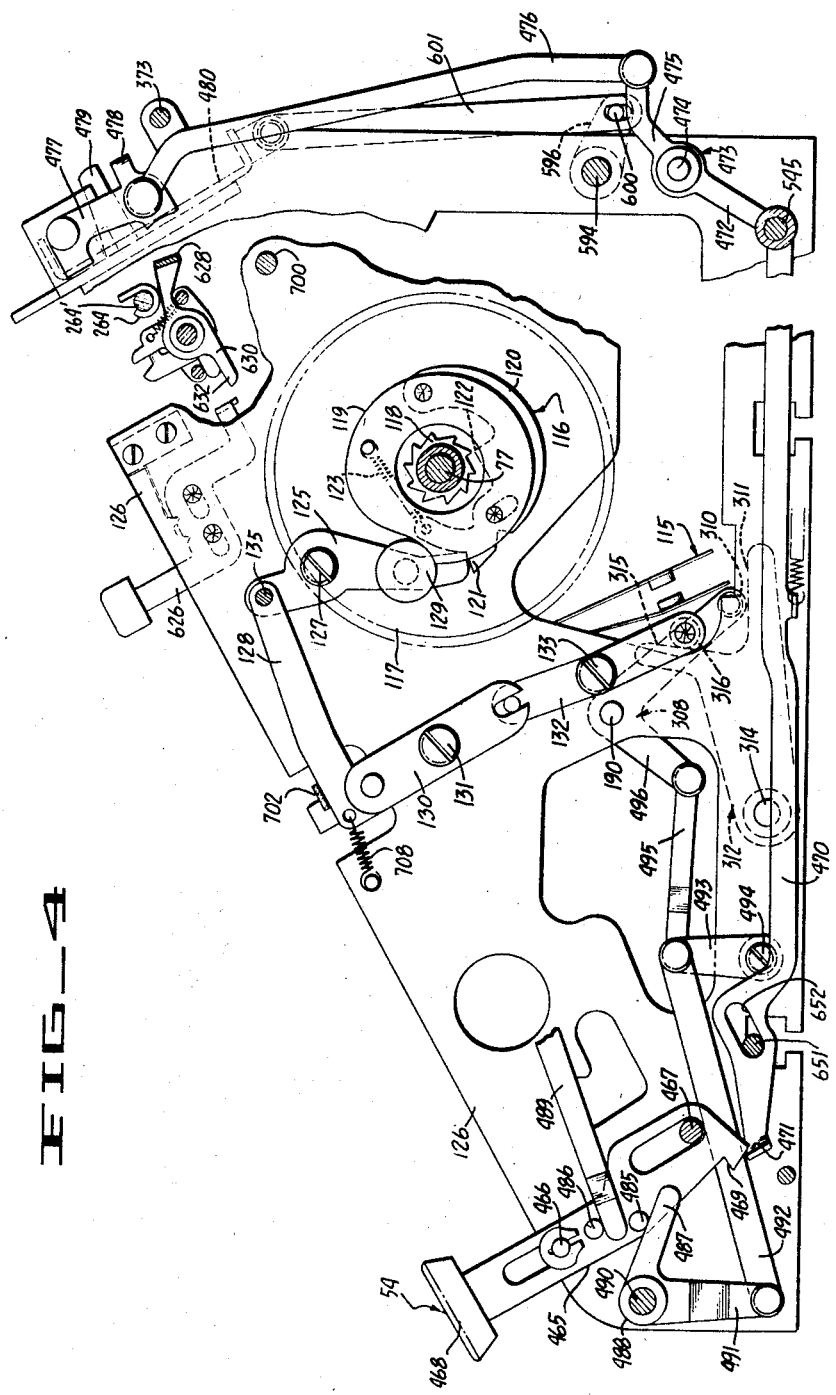

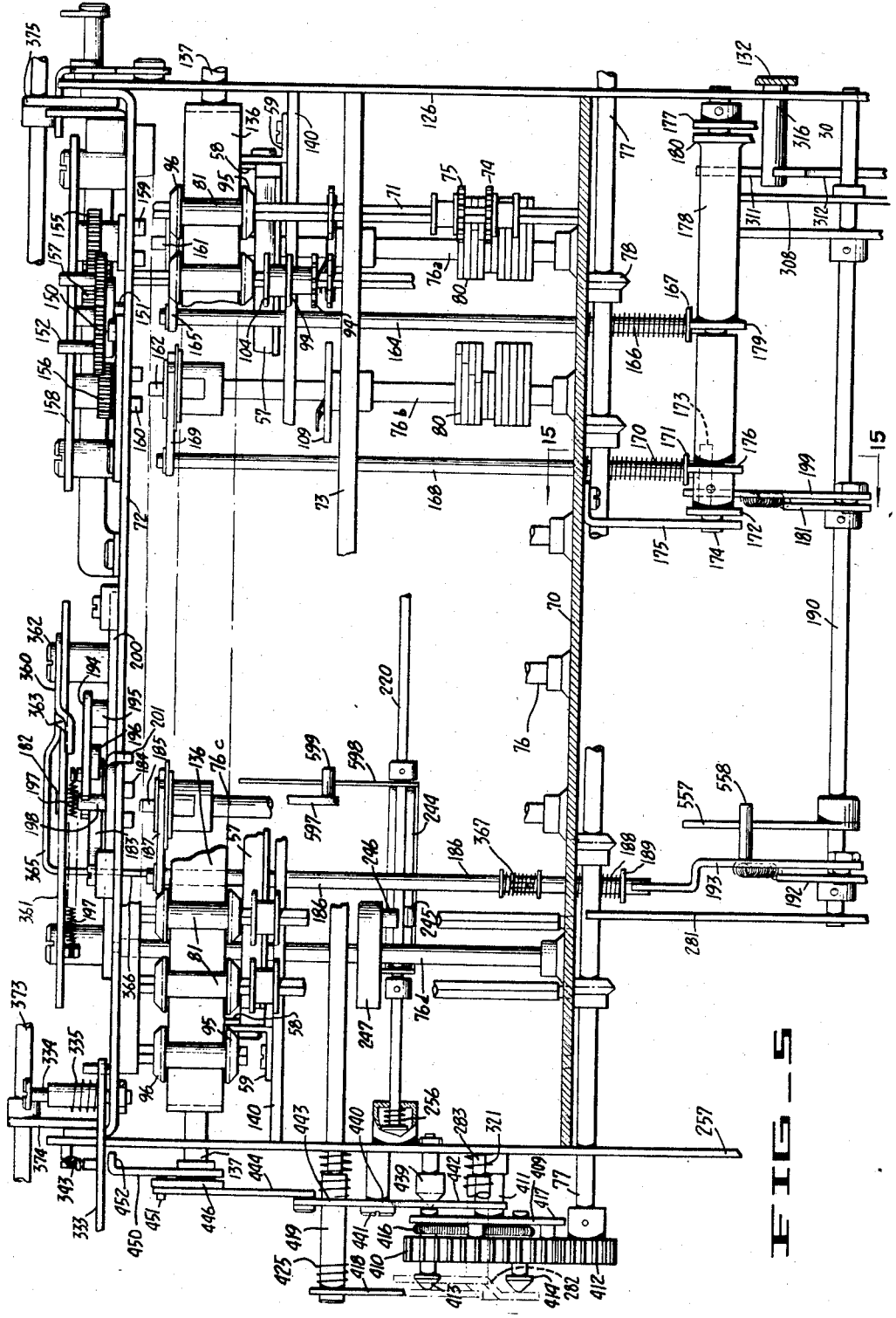

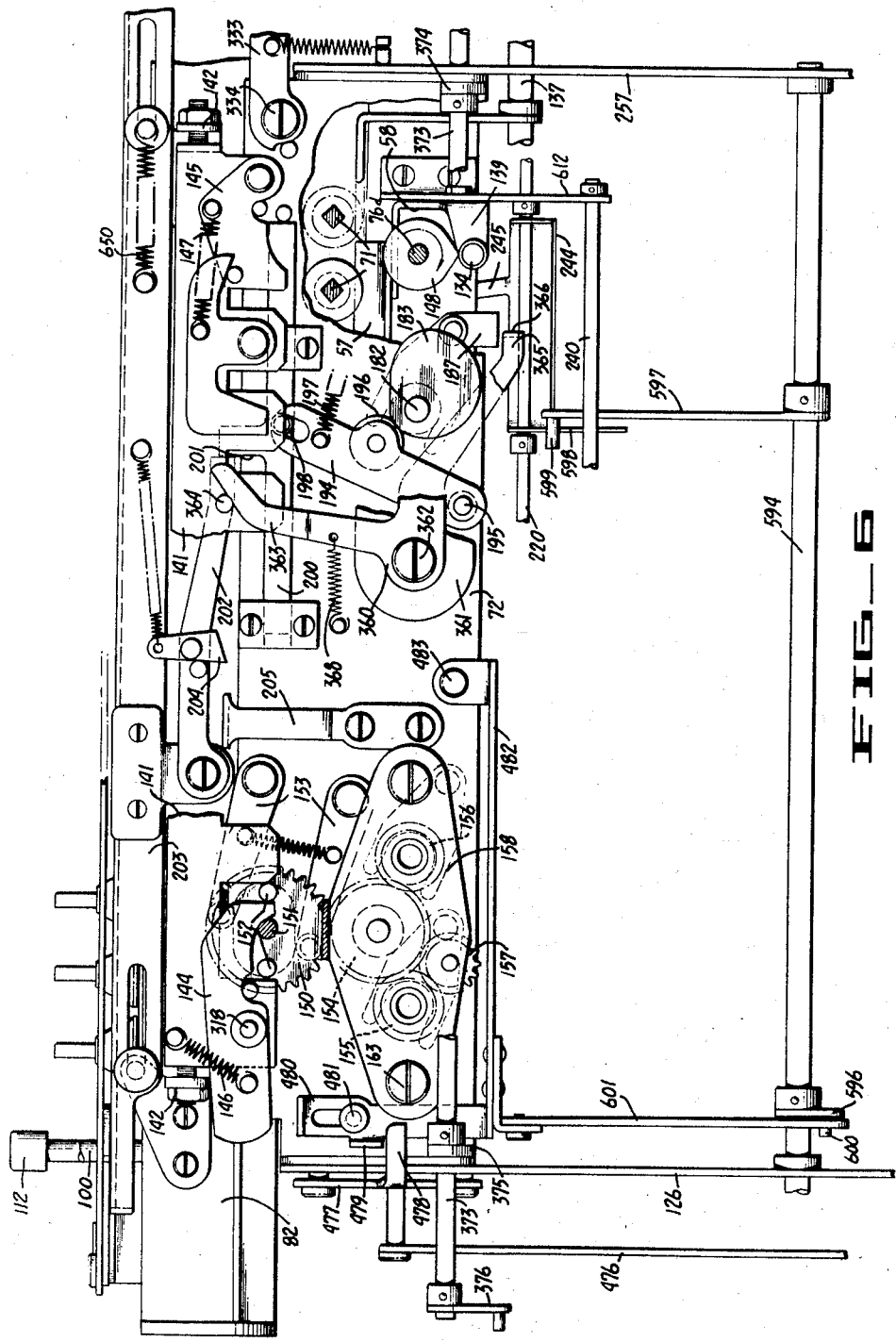

March 15, 1960 G. C. ELLERBECK 2,928,597
INTERREGISTER TRANSFER DEVICE FOR CALCULATING MACHINES
Original Filed March 5, 1956 14 Sheets-Sheet 6
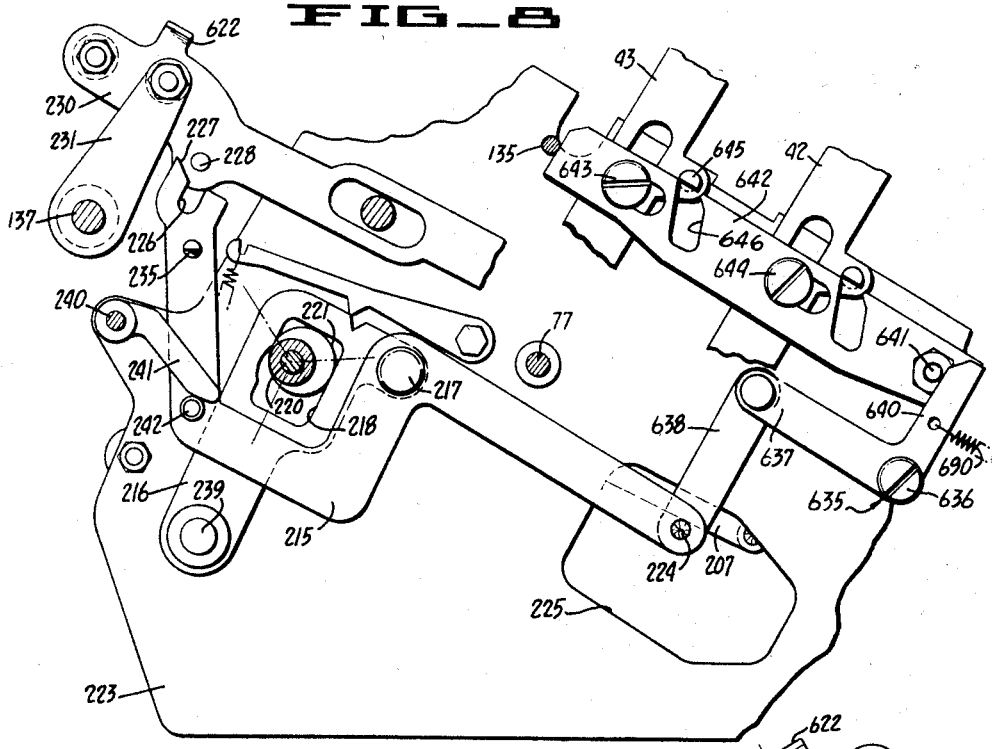
FIG_8
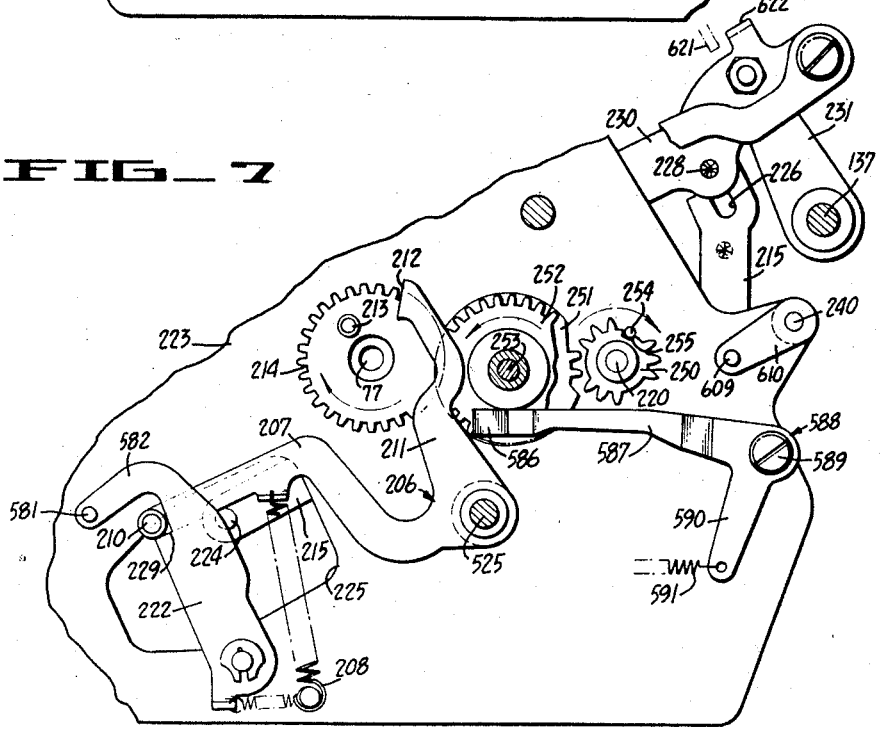
FIG_7

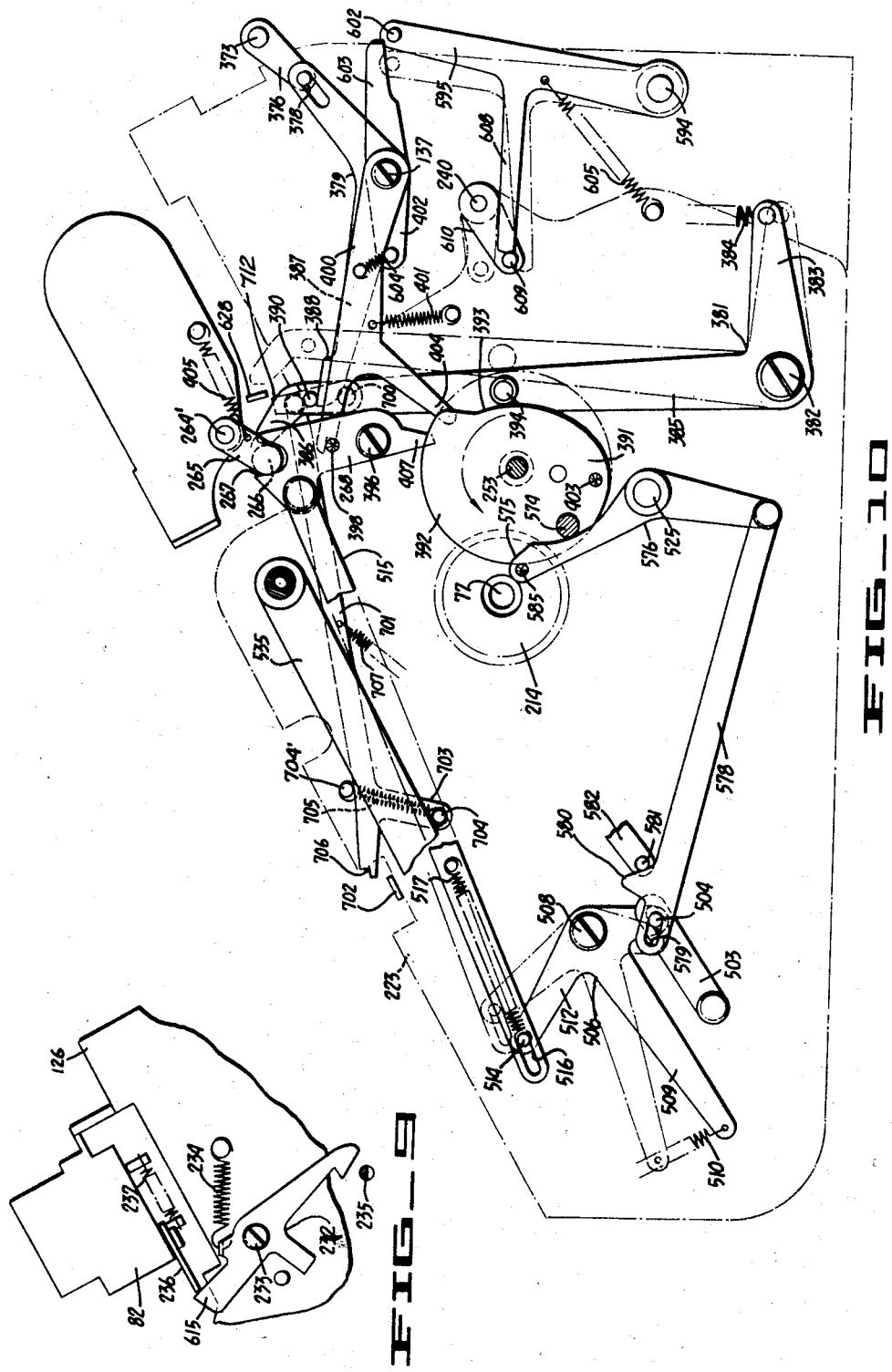

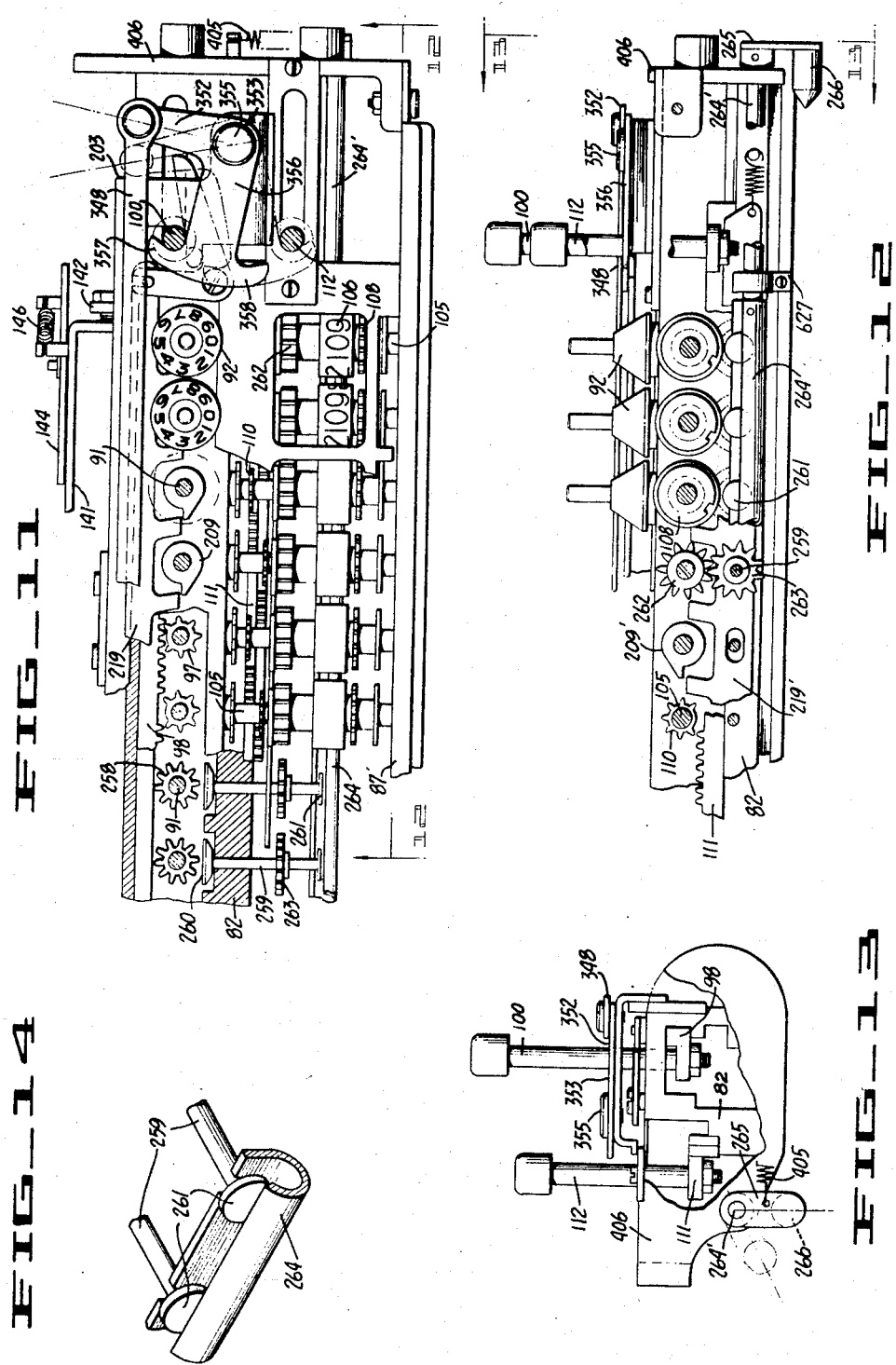

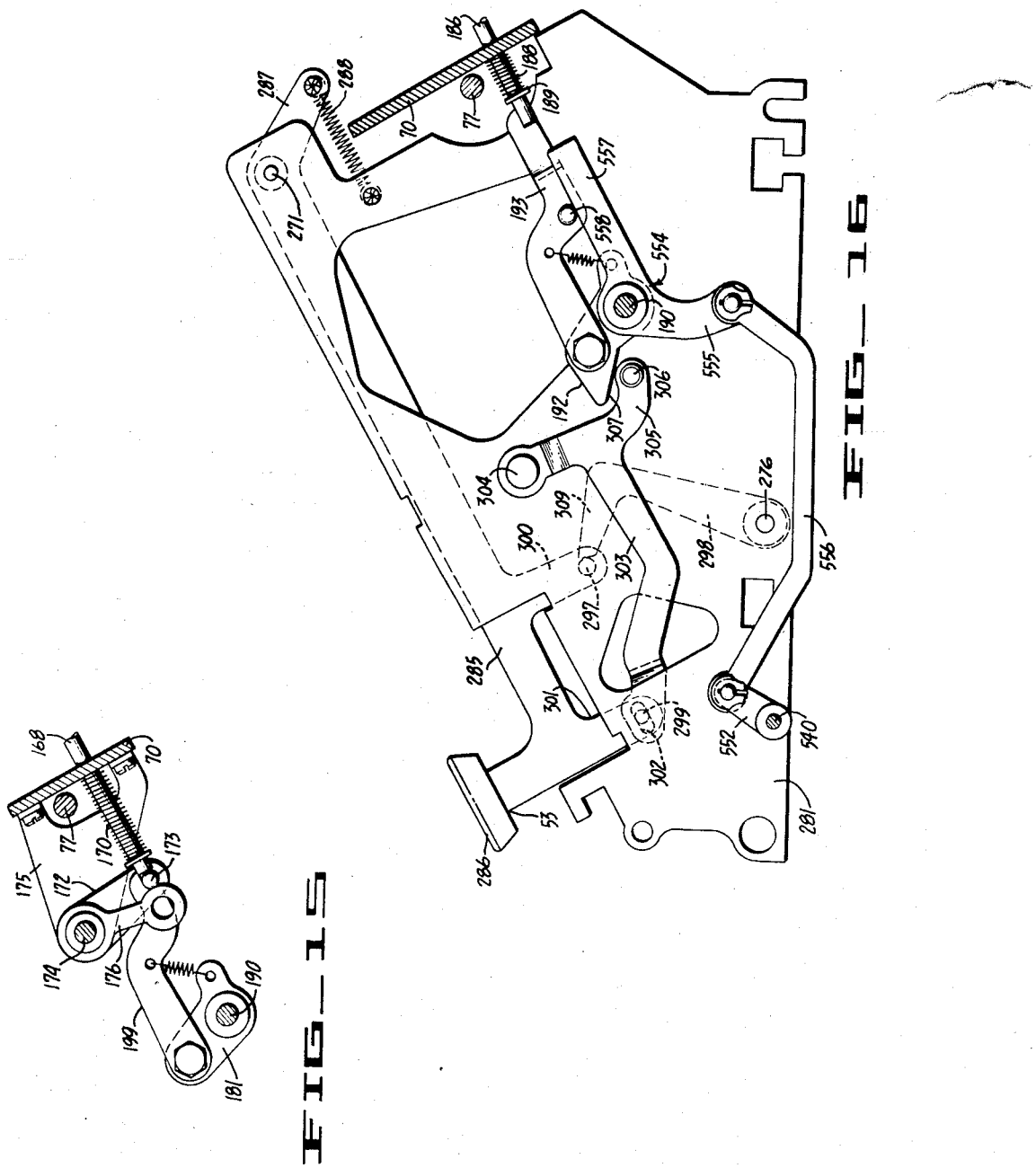

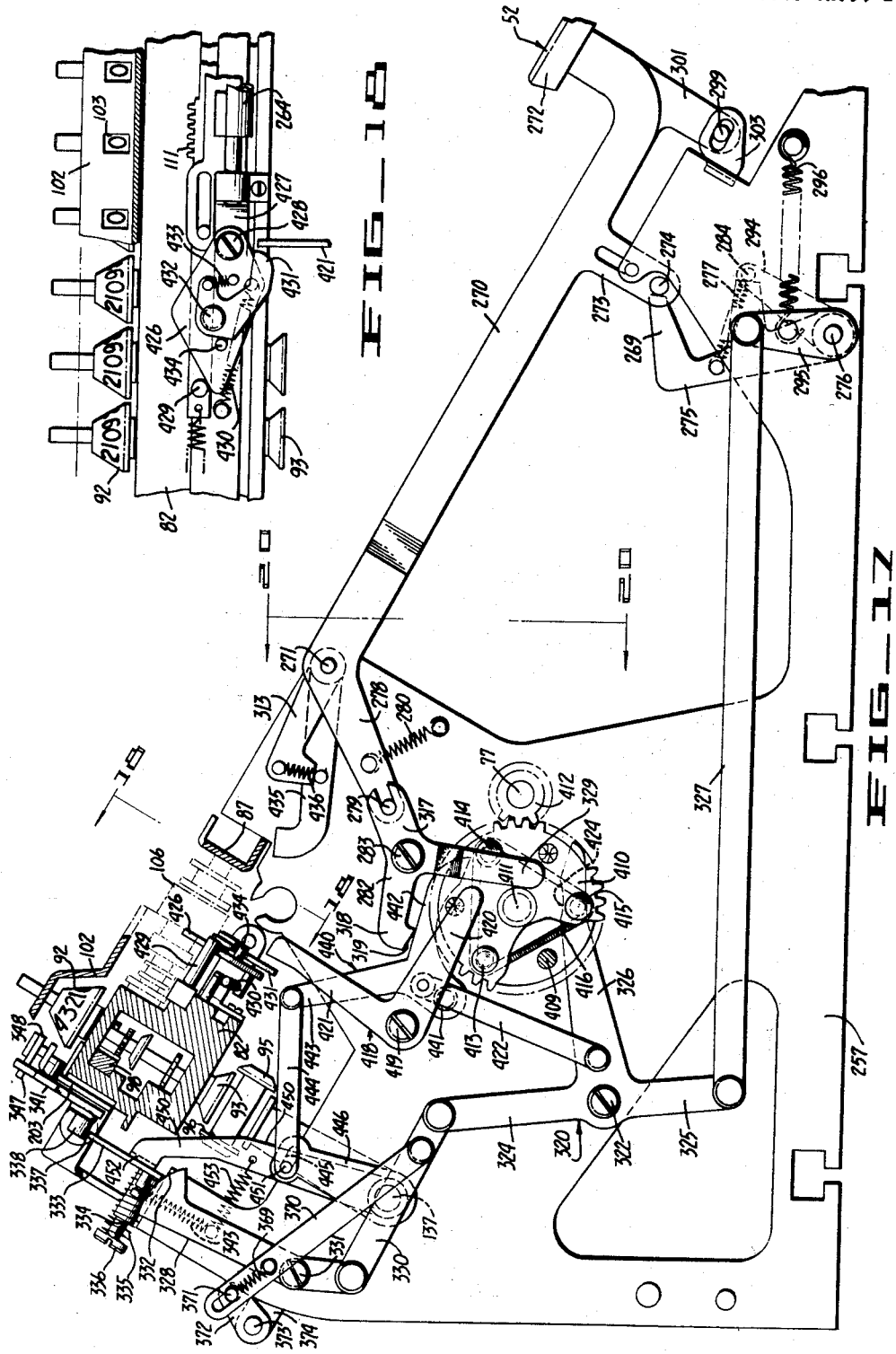

March 15, 1960     G. C. ELLERBECK     2,928,597
INTERREGISTER TRANSFER DEVICE FOR CALCULATING MACHINES
Original Filed March 5, 1956     14 Sheets-Sheet 11
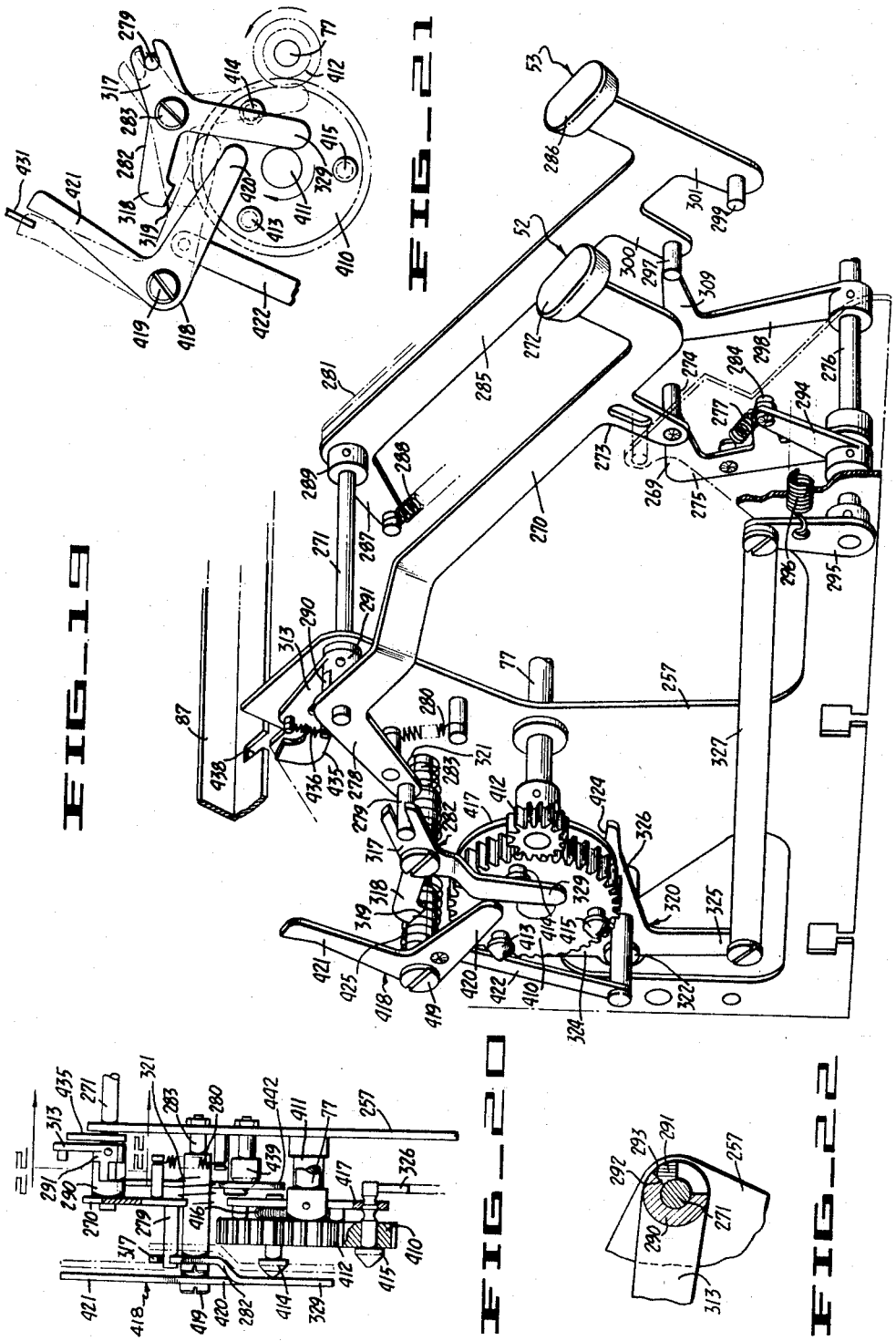

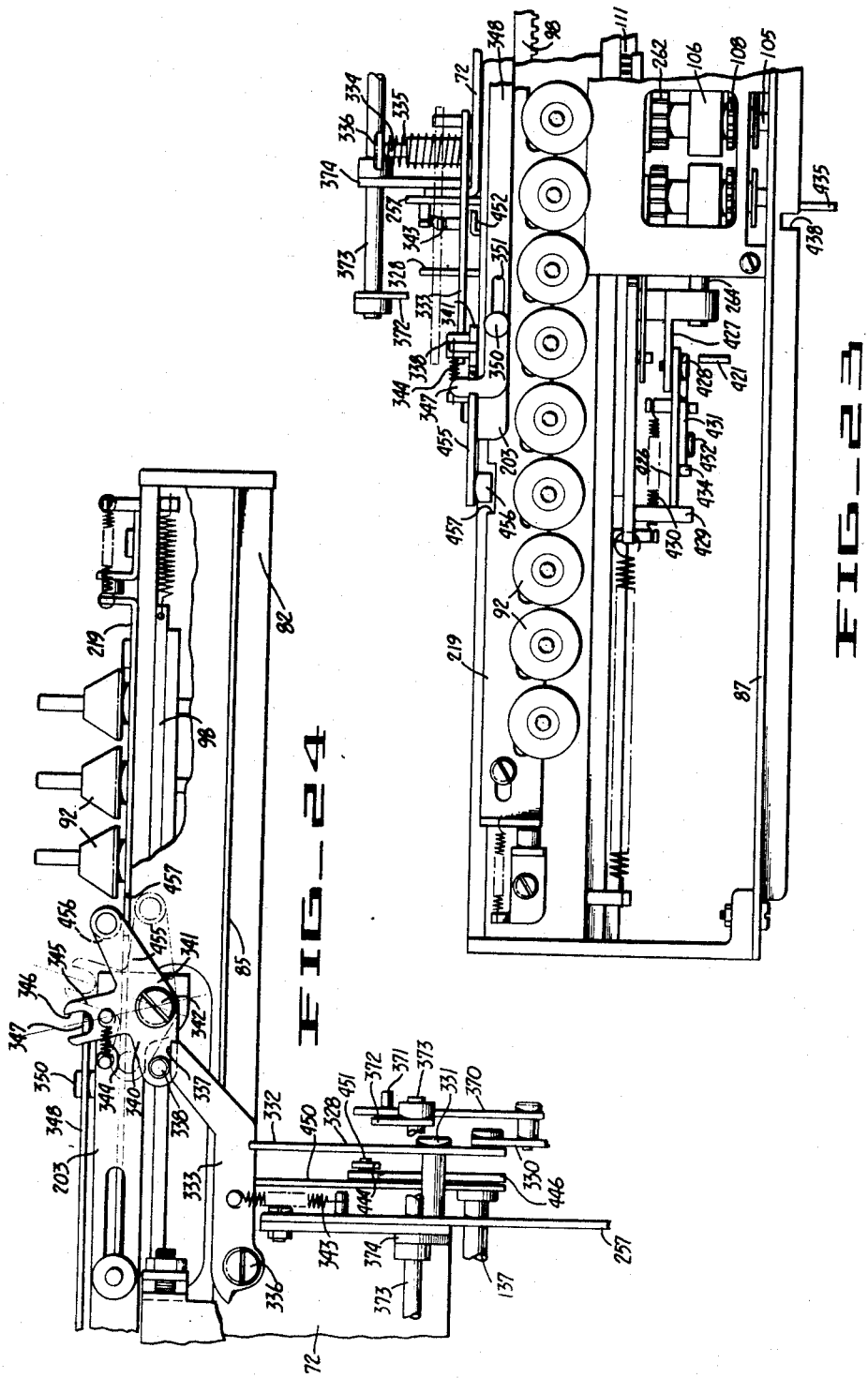

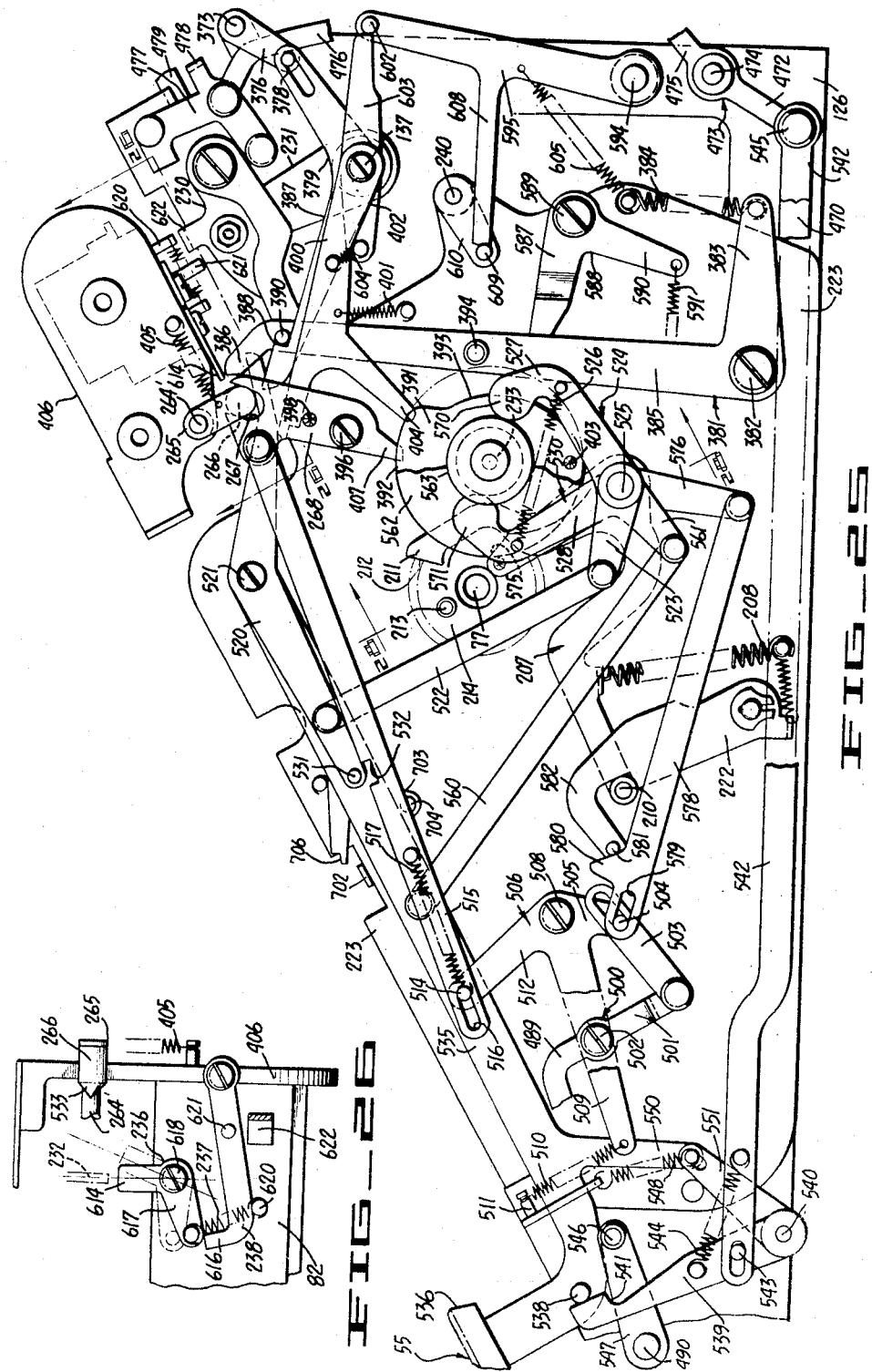

March 15, 1960     G. C. ELLERBECK     2,928,597
INTERREGISTER TRANSFER DEVICE FOR CALCULATING MACHINES
Original Filed March 5, 1956     14 Sheets-Sheet 14
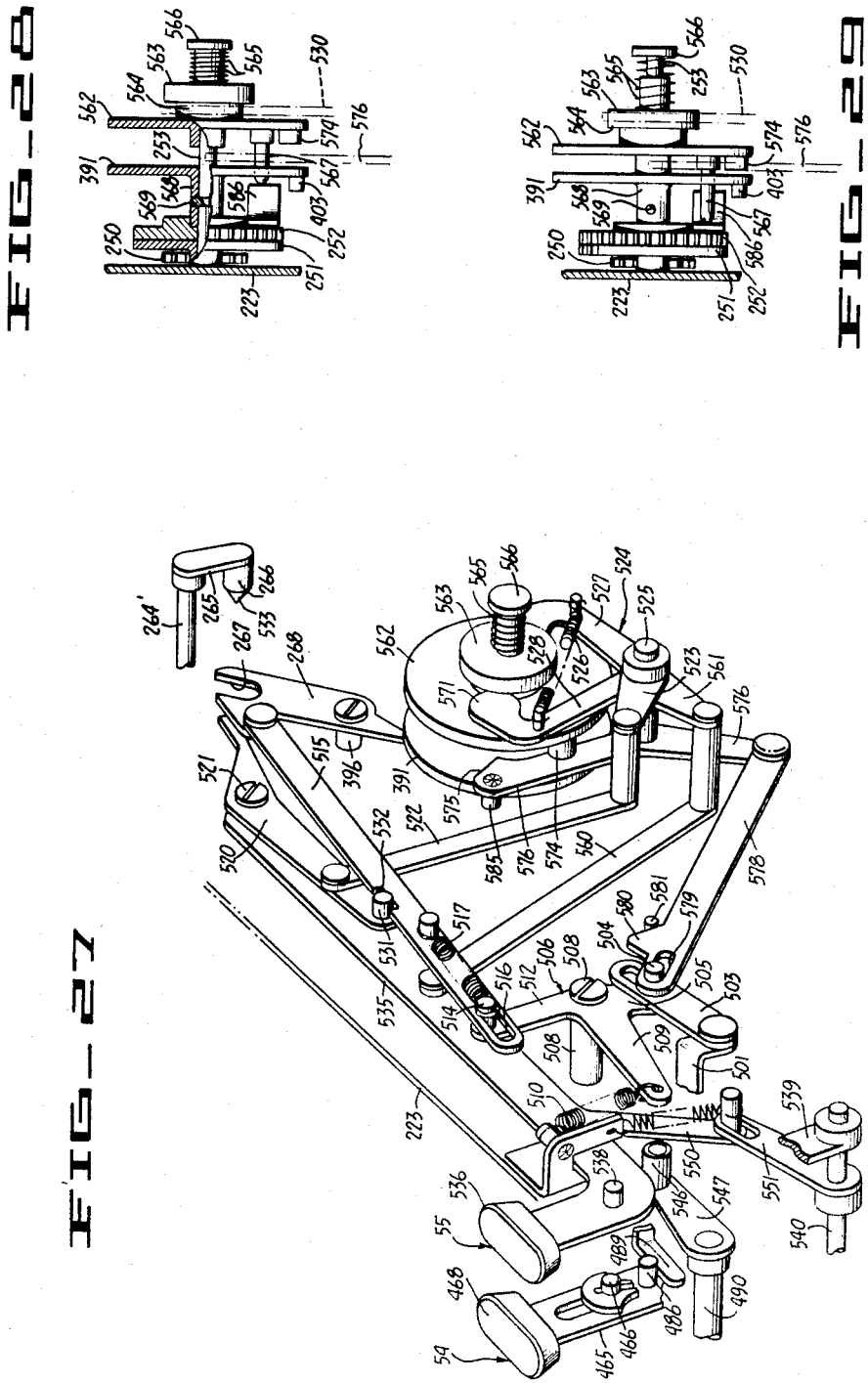

United States Patent Office 2,928,597
Patented Mar. 15, 1960

2,928,597

INTERREGISTER TRANSFER DEVICE FOR CALCULATING MACHINES

Grant C. Ellerbeck, San Leandro, Calif., assignor to Friden, Inc., a corporation of California Continuation of application Serial No. 569,326, March 5, 1956. This application August 12, 1958, Serial No. 754,629

17 Claims. (Cl. 235—63)

This invention relates to mechanical calculating machines, such as the well-known Friden calculating machine, and more particularly to such a machine having manually controlled mechanism for transferring values between the accumulator, or product, register and the counter register thereof, and is a continuation of my copending, but later abandoned, application filed March 5, 1956, S.N. 569,326.

It is a primary object of the present invention to provide, in a mechanical calculating machine having a conventional accumulator register, selection and actuating mechanism, and a counter register, a power-operated mechanism which may be selectively operated to transfer a value standing in either of the registers into the other one, preferably first shifting the accumulator register carriage to its extreme left-hand position if the carriage is displaced from that position. This mechanism is valuable to enable an operator to:

A. Accumulate grand totals in the counter register, by first transferring such values from the counter register to the product register for addition to the value standing therein, thereby utilizing the conventional tens-transfer mechanism in the product register, and then transferring the grand total so accumulated back to the counter register for storage while clearing the accumulator register for a new problem.

B. Transfer values from the counter register, such as a quotient derived from a division operation into the accumulator register additively so that it can be used as an augend to which other values may be added.

C. Transfer a value standing in the accumulator, or product register, into the counter register, after which it can be used for some desired purpose, such as, for example, a multiplier factor as described in my Patent No. 2,872,115 issued February 3, 1959, and thereby enable an operator to work problems of the nature of $A \times B \times C$.

D. Set a value inserted into the keyboard into the counter register by a two-step process which includes, in the first step, the subtracting of the keyboard value from the accumulator register while that register is connected with the counter, and then, after the digitation phase of this first cycle and before a tens-transfer can occur in the accumulator, releasing the inter-register connection; and, in the second cycle of machine operation, adding the keyboard value into the accumulator register in order to return the accumulator register to its original value, after which the value so transferred from the selection mechanism into the counter may be used as a multiplier value or otherwise, as desired by the operator.

In its preferred form, the mechanism is operative to transfer a value from the counter register into the product register or to transfer a value from the product register into the counter register in one operating cycle of the machine; or to first transfer a value from the counter into the accumulator to add to whatever value is in the accumulator, and then the total so secured back to the counter in order to accumulate values in the counter register; or effect transmission of a value from the selection mechanism into the counter register in not more than three operating cycles of the machine. Likewise, in its preferred form, the mechanism utilizes, to the maximum possible extent, machine parts provided for other purposes; accomplishes interregister transfer of values without interfering with, or adversely affecting, other machine operations, such as multiplication and division; includes the interregister transfer mechanism in a machine no larger than the former production machine not having such mechanism; provides for the entry, in a Friden type machine, of both factors of a multiplication problem from a single keyboard; and greatly increases the usefulness and flexibility of the machine; extends the capacity of the machine to handle various kinds of problems, and enables the machine to handle many problems with increased speed and greater facility.

Other objects and advantages will become apparent from a consideration of the following description and the appended claims in conjunction with the accompanying drawings wherein:

Fig. 1 is a top plan view of a calculating machine including the present invention therein;

Fig. 2 is a fragmentary, vertical cross-sectional view substantially on a longitudinal plane indicated by the line 2—2 of Fig. 1;

Fig. 3 is a fragmentary elevational view looking from the rear along a plane indicated by the line 3—3 of Fig. 2, and showing the rear end of the right shift drive clutch and the right-hand end of the tens-transfer restore bail;

Fig. 4 is a fragmentary, vertical cross-sectional view of the drive mechanism on the right side of the machine, with the machine cover and shiftable carriage removed, substantially on a plane indicated by the lines 4—4 of Fig. 1;

Fig. 5 is a fragmentary cross-sectional view primarily of the shifting and power clearing mechanisms taken on a plane substantially parallel to the top surface of the machine, as indicated by the line 5—5 of Fig. 2;

Fig. 6 is a fragmentary rear elevational view of the machine, with the cover removed;

Fig. 7 is a fragmentary, right side view of the automatic division programming mechanism of the machine, taken on a longitudinal vertical plane parallel to, and to the right of, the section plane of Fig. 4;

Fig. 8 is a left side view of the division programming mechanism shown in Fig. 7, being taken from the left side of the right-hand frame plate while Fig. 7 shows the right side thereof;

Fig. 9 is a detail of the division programming latch associated with the mechanism shown in Figs. 7 and 8;

Fig. 10 is a cross-sectional view substantially on a plane indicated by the line 10—10 of Fig. 1, with the machine cover removed and certain parts of the mechanism omitted to simplify the drawing, and shows certain components of the control mechanism of the present invention;

Fig. 11 is a fragmentary top plan view of the machine carriage, with parts broken away and shown in cross-section to better illustrate the construction, and shows the application of interregister control gears to the conventional mechanism of the carriage;

Fig. 12 is a fragmentary cross-sectional view of the carriage shown in Fig. 11, such as on a plane indicated by the line 12—12 of Fig. 11;

Fig. 13 is an end elevational view of the right-hand end of the machine carriage as indicated by the line 13—13 of Fig. 12, and shows a portion of the carriage end plate broken away to show details of the register clearing and interregister transfer control;

Fig. 14 is a fragmentary perspective view of a transfer gear control bail and associated portions of transfer gear elements shown in Figs. 11 and 12;

Fig. 15 is a fragmentary longitudinal cross-sectional view substantially on a plane indicated by the line 15—15 of Fig. 5; and shows control mechanism for the left shift drive clutch for shifting the carriage to the left;

Fig. 16 is a cross-sectional view on a plane indicated by the line 16—16 of Fig. 1, with the machine cover removed and parts omitted to simplify the drawing, and shows mechanism for disabling the automatic register clearing operation of the machine under certain conditions;

Fig. 17 is a cross-sectional view of the left side of the machine of the present invention, with the machine cover removed, such as taken on the plane indicated by the line 17—17 of Fig. 1, and shows particularly the control mechanism for certain procedures of the present invention;

Fig. 18 is a fragmentary elevational view of the front side of the machine carriage, as indicated by the line 18—18 of Fig. 17, and shows carriage mounted conditioning means for the timing mechanism shown in Figs. 17 and 19 to 21, inclusive;

Fig. 19 is a perspective view of a portion of the control mechanism shown in Fig. 17 at the left-hand end of the machine;

Fig. 20 is a fragmentary cross-sectional view on a plane indicated by the line 20—20 of Fig. 17, and shows a front view of the timing mechanism for the counter register to product register transfer and counter register accumulating operations of the machine;

Fig. 21 is a fragmentary end elevational view of the mechanism shown in Fig. 19;

Fig. 22 is a fragmentary cross-sectional view on a plane indicated by the line 22—22 of Fig. 20;

Fig. 23 is a fragmentary top plan view of the left-hand portion of the machine carriage, with the carriage cover removed, and shows particularly mechanism for transmitting power from the source of power in the machine frame to the interregister transfer mechanism in the carriage;

Fig. 24 is a rear elevational view of the portion of the carriage and transfer mechanism shown in Fig. 21;

Fig. 25 is a fragmentary and elevational view of the right-hand end of the machine, with the cover removed, as observed from the plane indicated by the line 25—25 of Fig. 1, and shows the control mechanism for the counter register to product register transfer operation and for the selection mechanism to counter register transfer operation;

Fig. 26 is a fragmentary bottom plan view of the right-hand end portion of the machine carriage, as indicated by the line 26—26 of Fig. 25;

Fig. 27 is a perspective view of a portion of the manually actuated control, or conditioning, mechanism shown in Fig. 25;

Fig. 28 is a front elevational view looking from a plane indicated by the line 28—28 of Fig. 25, with parts of the mechanism broken away and shown in cross-section to better illustrate the construction thereof; and Fig. 29 is an elevational view similar to Fig. 28, but with the parts shown in a different operative position from that shown in Fig. 28.

In the accompanying drawings the mechanism for transferring values between the product and counter registers of the machine, and from the selection mechanism to the counter register, is fully illustrated. However, the major portion of the calculating machine itself is not completely shown, for it is believed that the invention will be more readily understood if only those parts which are involved in the operation of the transfer mechanism are shown in detail. For a complete description of the construction and operation of the known calculating machine, reference may be had to the following United States patents, all issued to Carl M. F. Friden: Nos. 2,229,889, issued January 28, 1941; 2,273,857, issued February 24, 1942; 2,279,455, issued April 14, 1942; 2,294,083, issued August 25, 1942; 2,294,111, issued August 25, 1942; 2,313,817, issued March 16, 1943; 2,327,981, issued August 31, 1943; 2,376,997, issued May 29, 1945; 2,403,273, issued July 2, 1946.

The machine, as illustrated in Fig. 1, comprises a relatively fixed portion A enclosed in a cover 40, and a shiftable carriage B mounted on the rear portion of the fixed portion A for longitudinal reciprocatory movements relative to the fixed portion. The fixed portion A carries a full keyboard 41 having one-hundred keys, including "0" keys. The fixed portion also carries the several manually operated control keys, including the plus bar, or addition key, 42; the subtraction key 43; the right and left carriage shift control keys 44 and 45; the dividend entry, or tabulation, key 46; the division control keys 47 and 48; the add, or single cycle control, key 50; and the keyboard clear key 51. In addition to these usual control keys, there is also provided a counter register to product register transfer control key 52; an accumulate key 53; for enabling the mechanism to transfer values from the counter register into the product register in order to add the values in the two registers together with necessary tens-transfers, and then from the product register to the counter register for storage as a "Grand Total"; a product register to counter register transfer key 54; and a control key 55 for transmitting a keyboard factor into the counter register, so that it could be used as a multiplier factor, for example, in a machine of the type disclosed in my patent, No. 2,872,115 above-mentioned.

1. Selection mechanism

The selection mechanism is partially illustrated in Figs. 1 and 2 and includes the keyboard 41, the individual value keys 60 of which comprise flat stems 61 mounted for limited vertical movement in the keyboard frame 62. Each stem carries a key top 63 on its upper end and a perpendicularly projecting, slide setting pin 64 near its lower end. The keys are arranged in ordinal rows with value, or digit, keys from "1" to "9" and a "0", or ordinal clear, key in each row. A pair of selection bars 65 extends under each key row, which bars are provided in their upper edges with V-notches having differentially inclined cam edges 66 with which the pins 64 engage to differentially set the bars in accordance with the selection made by depression of a digit key in the corresponding keyboard order. It is conventional in the machine of the patents above-mentioned, for one of these V-notch, or selection, bars to serve the "1" to "5" keys and the other, the "6" to "9" keys. The bars are supported for longitudinal movement on pivoted struts, as indicated at 68, and, at their rear ends, extend through, and are guided in, notches in a transverse frame member 70 of the machine.

Ordinally arranged square shafts 71 are journalled at their front ends in bearing apertures in the frame plate 70, and extend rearwardly from this plate in parallelism with the slides 65 to a rear, transverse frame plate 72 in which the rear ends of the square shafts are journalled. The square shafts are also journalled, intermediate their lengths, in a transverse frame plate, or cross-member, 73, disposed between, and parallel to, the transverse frame members 70 and 72. A pair of selection gears 74 and 75 is mounted on each square shaft 71 for sliding movement along the square shaft, and are effective to control the rotation of the corresponding square shafts. Each bar 65 is shaped at its rear end to form a yoke which embraces a complementary annular slot formed in the hub of a selection gear 74 or 75 on the coordinal square shaft 71, so that one or the other of the selection gears will be differentially set in accordance with the selection of a digit key in the coordinal row of keyboard keys.

2. Actuating mechanism

A series of actuating shafts 76 (Fig. 2) are disposed below, and parallel to, the square shafts 71; and are journalled in the frame cross-members 70 and 73. These actuating shafts are all driven from a common drive shaft 77 through miter gear connections 78. As shown in Patent No. 2,273,857 above-mentioned, there are approximately one-half as many actuator shafts as square shafts, with one actuator shaft disposed between, and below, each pair of adjacent square shafts. Each of the five actuator shafts 76 disposed between adjacent square shafts, in the ten order machine illustrated, carries a single stepped actuating drum 80 engageable with the selection gears 74 and 75 on the two adjacent square shafts to impart to the square shafts rotational increments corresponding to the selection of digit keys in the coordinal key rows. An actuating, or "plus-minus," spool 81 is slidably and nonrotatably mounted on each square shaft 71 between the frame cross-members 73 and 72.

3. Product register

The carriage B (Figs. 1 and 2) has a frame 82 of hollow, rectangular cross-sectional shape, preferably provided by securing two channel-shaped members together with their open sides in opposition. This frame is supported at its rear side by a frame ledge 85 riding on the upper edge of a rectangular bar 86 secured to the upper portion of the rear cross-member 72. At its front side, the carriage is supported by a channel-shaped carriage rail 87 spaced forwardly of, and secured to, the carriage frame 82 in parallel relationship thereto. The rail 87 rides on a bearing bar 88 or on rollers, not shown, carried by a transverse frame member 90.

A series of ordinally arranged dial shafts 91 extend vertically through the carriage frame 82. Each such dial shaft is journalled in the frame and on its upper end, above the frame, carries a numbered dial 92; and on its lower end, below the frame, carries a bevel gear 93. Each actuating spool 81 has a cylindrical intermediate portion normally disposed directly below the aligned bevel gear 93, on the ends of which bevel gears 95 and 96 are disposed. These gears 95 and 96 are selectively meshable with the corresponding bevel gear 93 upon translation of the actuating spool forwardly or rearwardly, as the case might be.

A mutilated clearing, or zeroizing, gear 97 (see also Fig. 11) is mounted on each dial shaft 91, within the hollow frame 82. A clearing rack 98, mounted for longitudinal sliding movement in an internal groove in the carriage frame, engages the teeth of any gear 97 which is displaced from its "0" position, when the rack is moved to the right relative to the carriage frame. The rack is provided at its right-hand end with a knob 100 (Figs. 1 and 13) projecting upwardly through a slot 101 in the carriage cover 102 for manually operating the rack to clear the product register. The carriage cover is also provided with window openings 103 through which the numbers on the dials 92 are viewed. A zero stop cam 209 (Fig. 11) is mounted on each product register dial shaft 91 between the top surface of the carriage frame and the associated dial 92. A zero stop slide 219 is slidably mounted on the top surface of the carriage frame and has forwardly projecting fingers which engage the cams 209 to positively stop the dials 92 in "0" position when the register is zeroized, as is well-known in the art.

4. Tens-transfer mechanism

Each product register dial assembly includes a tens-transfer cam 83 (Fig. 2) mounted on the dial shaft 91 at the bottom surface of the carriage frame 82 and having a single lobe of limited angular extent angularly positioned relative to the "0" indication of the coordinal dial 92, so that the cam lobe will move past a predetermined position whenever the dial moves from its "0" to its "9" or from its "9" to its "0" position. A series of ordinally arranged bellcrank levers 84 are pivotally mounted on the carriage frame 82 and disposed against the bottom surface thereof. Each of these levers has a tail bearing against the edge of the coordinal tens-transfer cam 83 and a depending ear formation 89 on its forward end in a position aligned with the next higher register order.

Tens-transfer gears 94 are slidably mounted, one on each square shaft 71 rearwardly of the frame cross-member 73. Each of these gears has an elongated hub carrying two spaced-apart, annular flanges 99 and 104 receiving between them the depending ear 89 of the transfer lever 84 associated with the adjacent lower order. This arrangement is such that when a product register dial is turned through the "9" to "0" or the "0" to "9" position, the tens-transfer gear of the next higher order is moved forwardly into the path of a single-toothed tens-transfer actuator 109 mounted on the actuator shaft 76 associated with the higher order. A more complete description of this tens-transfer mechanism will be found in the Patent No. 2,229,889 above-mentioned.

In order to restore all of the set transfer gears 94 by the end of the coincident cycle, a bail 57 (Figs. 2 and 5) extends transversely of the machine, below the hubs of the tens-transfer gears 94. This bail includes a vertically extending flange disposed between the two flanges 99 and 104 of each of the tens-transfer gears. Bail 57 is supported at its ends by bellcranks 58 (Figs. 2 and 5) disposed one at each end of the bail and rockably mounted on brackets 59 carried by the frame cross-member 140. The rearwardly extending horizontal arm of each bellcrank 58 is provided with an angular projection 139, upon each of which is rotatably mounted a cam following roller 134 (Figs. 2, 3 and 6), bearing against the outer edges of single lobe cams 148 and 149 (Figs. 2 and 3), respectively, mounted on the extreme left-hand actuator shaft 76d (Fig. 6) and the extreme right-hand actuator shaft 76a (Fig. 2). A spring 56, tensioned between a depending arm 58a of the right-hand bellcrank 58 and shaft 137, serves to maintain the rollers 134 in engagement with the respective cams. The lobes of the cams 148 and 149 are of limited angular extent and so positioned angularly on the corresponding shafts 76a and 76d that they rock the bail 57 at the end of each operating cycle of the machine to restore all tens-transfer gears 94 which have been moved to operative position. The lobes of cams 148 and 149, in their full-cycle positions, maintain bail 57 in its rocked position (shown in Fig. 2), in which position the various tens-transfer gears 94 are held in their rearward, inoperative, positions. Immediately upon initiation of each machine cycle, the rotation of the cams enables the follower rollers 134 to ride off the lobes, and thereby enables spring 56 to rock bail 57 (counter-clockwise in Fig. 2) to release the tens-transfer gears for forward movement to a tens-transfer position upon operation of the respective transfer levers 84.

5. Counter register

The counter register comprises a series of ordinally arranged dial shafts 105 (Figs. 2 and 11) extending between, and journalled in, the carriage frame 82 and the front rail 87, with their rotational axes substantially perpendicular to the rotational axes of the coordinal product register dial shafts 91. A numbered dial 106 is mounted on each counter dial shaft 105, the figures on these dials being visible through window openings 107 in the carriage cover 102 (Figs. 1 and 2). A counter drive gear 108 is mounted on each counter dial shaft 105 and is driven by a counter actuating mechanism 625, as fully disclosed in Patent No. 2,388,209, patented October 30, 1945 by Carl M. F. Friden for "Revolutions Counter Actuator." This actuator operates the counter register to indicate the number of operating cycles of the machine since the last clearing of the counter register. This actuator may be rendered ineffective by a manually controlled lever diagrammatically shown at 626 (Fig. 4) and fully disclosed in Patent No. 2,366,345, patented January 2, 1945 by Anthony B. Machado for "Revolutions Counter Control."

A mutilated clearing, or zeroizing, gear 110 is mounted on each counter dial shaft 105. A clearing rack 111, mounted for longitudinal sliding movement in a recess in the front side of the carriage frame, engages those gears displaced from their "0" positions when the rack is moved to the right relative to the carriage frame, to turn the counter dials back to their "0" positions and thereby clear the counter register. A knob 112 (Figs. 1 and 13) projects from the right-hand end of the clearing rack 111 through a slot 114 in the carriage cover 102 for manually moving this rack to clear the counter register. A zero stop cam 209′ (Fig. 12), similar to cams 209, is provided on each revolutions counter shaft 105 for cooperation with a corresponding zero stop slide 219′ when the counter register is cleared, or zeroized.

6. Addition and subtraction

The addition and subtraction keys 42 and 43 (Fig. 8) are operatively connected to the single cycle clutch 116 and motor control switch 115 (Fig. 4) by a conventional mechanism. This mechanism, briefly, includes a notched clutch control slide 642 (Fig. 8) slidably mounted on the control plate 223 for longitudinal movement thereon by suitable means, such as the fixed screws 643 and 644 extending through corresponding slots in the slide. The clutch slide 642 is moved rearwardly by both the plus and the minus keys, as by pins 645 on the key stems engaging the diagonal cam slots 646 in the clutch slide. A pin 135 projects perpendicularly from the upper end of clutch control lever 125 (Fig. 4), so that this lever is rocked (clockwise as viewed in Fig. 4) whenever the addition or the subtraction key is depressed, as fully disclosed in the above-listed Friden patents, and particularly in Patent No. 2,327,981.

The clutch 116, as shown in Fig. 4, comprises a gear 117 driven by the motor, not illustrated, and journalled for free rotation adjacent the right-hand end of the main power shaft 77. A clutch element in the form of a ratchet hub 118 is fixed to the gear 117, and extends to the left along shaft 77 from the gear 117. The driven element of the clutch comprises a disk 119 secured to the shaft adjacent the ratchet 118, which disk carries a clutch pawl 120 pivotally secured at one end to the disk and provided near its other end with an outwardly projecting nose forming a stop shoulder, or abutment, 121. Intermediate its length the pawl 120 has an inwardly directed tooth 122 engageable with the ratchet teeth 118 to drivingly connect the gear 117 to the shaft 77. The pawl is urged into engagement with the ratchet teeth by a spring 123 tensioned between the disk 119 and the free end of the pawl 120. The clutch control lever 125 is pivotally mounted, intermediate its length, on the frame side plate 126 of the machine by any suitable means, such as screw 127. The lower end of this lever provides an abutment formation engageable with the stop shoulder 121 on the clutch pawl 120 to hold the tooth formation 122 of the pawl out of engagement with the ratchet teeth 118. The pin 135 projects perpendicularly from the upper end of lever 125, whereby the depression of either plus bar 42 or minus key 43, and the consequent rearward movement of clutch slide 642, and its engagement with the pin, rocks the clutch control lever 125 out of engagement with the clutch pawl 120. This frees the pawl to the force of spring 123, which rocks the pawl so that its tooth 122 engages one of the teeth of ratchet 118 to drivingly connect the motor driven gear 117 to the drive disk 119 and thus rotate the shaft 77. Preferably, the disk 119 has a slight depression at the full-cycle position thereof. A roller 129 mounted on the clutch control lever 125 is adapted to ride on the edge of the disk 119, thereby holding the clutch control lever 125 out of position to re-engage the clutch pawl 120 and holding the motor switch closed until the roller rides into the depression at the full-cycle position of the shaft 77.

A switch control lever 130 (Fig. 4) is pivotally mounted, intermediate its length, on the frame side plate 126 by a pivotal mounting 131. This lever is operatively connected to the clutch lever 125 by means of a link 128, the rear end of which is mounted on pin 135. The lower end of lever 130 is pivotally connected, by means of the pin-and-slot means shown, to the upper end of a switch lever 132, which is also pivotally mounted intermediate its length on the frame plate 126, as by a pivotal mounting 133. The lever 132 has its lower end in operating engagement with the motor switch 115 to close this switch and energize the motor whenever the clutch control lever 125 is rocked to engage the clutch 116.

As shown in Fig. 2, an add-subtract gate 136 is disposed below the intermediate portions of the add-subtract spools 81 and between the terminal gears 95 and 96 of these spools. It is supported at its ends on a transverse rock shaft 137 by similar bail legs, as indicated at 138. The depression of the addition key 42 or subtraction key 43 is effective to translate an add-subtract, or digitation control, link 230 (Figs. 7 and 8) rearwardly or forwardly, respectively, by means of the pins on the keys engaging oppositely inclined cam slots in the upper edge of this link, as is well-known to the art. The rear end of this control link 230 is pivotally connected to the upper end of an arm 231 that is keyed to the shaft 137. The depression of the add bar 42 is effective to move link 230, arm 231, and bail 136 rearwardly, i.e., in the direction to mesh the add gears 95 on the spools 81 with the dial gears 93. Thereafter, when the actuator drums 80 are cycled, they drive the register dials 92 in a positive, or additive, direction. Conversely, the depression of the subtract key is effective to move the link, arm, shaft and bail forwardly, to mesh gears 96 with the gears 93 and drive the register dials in a negative, or subtractive, direction when the machine is cycled.

If the addition or subtraction key is held down, the clutch 116 will normally remain engaged and the motor switch 115 closed so that the machine will continue to cycle. When operated, the "add," or single cycle, key 50 is effective, in a manner well-known to the art and disclosed in the above-listed Friden patents, to limit the operation of the machine to single cycle operation, regardless of whether or not the addition or subtraction key is held down.

7. Carriage shifting mechanism

As shown particularly in Fig. 5, the two right-hand actuator shafts 76, designated 76a and 76b, and the fifth actuator shaft from the right, designated 76c, are extended rearwardly of the transverse frame member 73 and are journalled rearwardly of this frame member in an auxiliary transverse frame member 140 (Fig. 2). The actuator shafts 76a and 76b are used in the power-operated, carriage shifting operation, and the actuator shaft 76c is used in the power clearing operation of the product register to be described in the next section.

A toothed rack 141 (Fig. 6) extends along the rear side of the carriage frame 82 and is pivotally connected at its ends to the carriage frame by pivotal mountings 142 for swinging movements toward and away from the frame. The teeth of this rack are separated by notches spaced-apart in accordance with the ordinal spacing of the product register. Override pawls 144 and 145 are pivotally mounted on the rack, one at each end thereof, and are urged to normal position by the springs 146 and 147, respectively.

A gear 150 is disposed at the rearward side of the transverse frame member 72, between the rotational axes of the actuator shafts 76a and 76b, being mounted on a shaft, or axle, 151 journalled in the frame members 72 and 158. The plate 158 is mounted on, and spaced rearwardly from, the crossframe member 72, by any suitable means, such as spacing studs 163. Pins 152 project rearwardly from the gear 150 from positions near the outer circumference of the gear and approximately 180° apart, and engage in the notches of the rack 141 to shift the carriage B an ordinal step for each machine cycle, i.e., 180° rotation of the gear, the direction of the carriage shift being in accordance with the direction of rotation of the gear. Suitable resilient centering means, as indicated at 153 in Fig. 6, are provided to releasably hold the gear 150 and the carriage B centered in the particular ordinal position which the carriage occupies.

An idler gear 154 is journalled on the frame members 72 and 158 below the gear 150 and meshes with this gear. The idler is driven by drive gears 155 and 156 which are journalled on the frame member 72 at respectively opposite sides of the gear 154. The drive gear 156 meshes directly with the spur gear 154, while the drive gear 155 is connected to the spur gear by a reversing idler gear 157, so that the drive gears 155 and 156 will drive the gear 150 in respectively opposite directions for the same direction of rotation of the drive gears. It will also be noted that the gear 154 is of the same diameter as the gear 150, while the drive gears 155 and 156 are one-half the diameter of the gear 154, so that the gear 150 will be driven through one-half of a rotation for a complete rotation of one of the drive gears. Thus, a complete rotation of one of the drive gears during a machine cycle will shift the carriage one ordinal step in the appropriate direction.

The drive gears 155 and 156 have hubs, or axles, journalled in the frame plate 72 and in the plate 158, and carry jaw clutch elements 159 and 160, respectively (Fig. 5), at the forward side of frame plate 72. The rear end of actuator shaft 76a carries a shiftable jaw clutch element 161 movable into driving engagement with the clutch element 159; and, similarly, the actuator shaft 76b carries a shiftable jaw clutch element 162 movable into driving engagement with the clutch element 160. A rod 164 extends slidably through the transverse frame members 70 and 140 adjacent, and parallel to, the actuator shaft 76a and its rear end carries a yoke 165 engaging the shiftable clutch element 161. A compression spring 166 surrounding the rod 164 between the front side of the frame cross-member 70 and an abutment washer 167 on the front end of the rod, resiliently urges the rod forwardly, i.e., in a direction to maintain the clutch element 161 out of engagement with the clutch element 159. A rod 168, similar to the rod 164, extends slidably through the transverse frame members 70 and 140 adjacent, and parallel to, the actuator shaft 76b. The rear end of this rod likewise carries a yoke 169 engaging the shiftable clutch element 162. A compression spring 170 surrounds this rod between the front side of the frame cross-member 70 and an abutment washer 171 on the front end of the rod, thereby resiliently urging the rod forwardly in a direction to maintain the shiftable clutch element 162 out of engagement with the clutch element 160. Means, not illustrated, but well-known to the art, are provided to preclude the simultaneous engagement of the clutch elements 161 and 162 with the corresponding clutch elements 159 and 160.

A shift control shaft 174 (Fig. 5) extends transversely of the machine, forwardly of the transverse frame plate 70, and is journalled at one end in the frame side member 126 and at its other end in a bracket 175 secured to the frame member 70. An arm 176 (see also Fig. 15), on the left-hand end of this shaft is disposed in opposition to the front end of the rod 168. An arm 177 on the right-hand end of the shaft is engaged by the carriage left shift key 45, so that the depression of the key causes rocking of shaft 174 and hence arm 176, which moves clutch rod 168 rearwardly to cause engagement of the clutch element 162 with the clutch element 160 and thus shift the carriage B to the left. A sleeve 178 is journalled on the shaft 174 between the rod 164 and the arm 177. An arm 179 on the left-hand end of this sleeve is disposed in opposition to the front end of the rod 164, while an arm 180 on the right-hand end of the sleeve is engaged by the right shift key 44, so that depression of this key causes rocking of the sleeve and hence arm 179, which forces the clutch rod 164 rearwardly to cause engagement of the clutch element 161 with the clutch element 159 and thus shift the carriage to the right. The carriage shift keys 44 and 45 are connected by means not illustrated, but well-known to the art, to the link 128 (Fig. 4) to engage the clutch 116 and close the motor switch 115 and thereby cause the machine to cycle when either of these keys is depressed. Means, also not illustrated, but well-known to the art, and fully disclosed in the above-listed Friden patents, is provided to disconnect the carriage shift clutches when the carriage reaches the ends of its range of movement and the corresponding override pawls are rocked.

A second arm 172 (Figs. 5 and 15) is pivotally mounted on shaft 174, adjacent arm 176. Its lower end is provided with a pin 173 extending to the right to lie between the front end of rod 168 and arm 176. A transverse control shaft 190 is disposed forwardly of shaft 174, being journalled on right side frame 126 and on auxiliary left side frame 281. An arm 181 is pinned to shaft 190 at a point adjacent the arms 172 and 176. A forward end of a pusher link 199 is pivotally connected at the outer end of the arm 181, the link 199 having a notched rear end of which bears against the pin 173 carried by arm 172. Thus, rocking of shaft 190 is effective to move rod 168 rearwardly to engage clutch elements 160 and 162 independently of manually controlled arm 176, for a purpose to be later described. Incidentally, it can be mentioned that link 199 is pivotally mounted on arm 181 for disengagement from pin 173 to terminate left shift operations under conditions not important to the present disclosure.

8. Automatic product register clearing

It is conventional, in the machine with which my invention is preferably associated, to provide a mechanism for automatically clearing the registers 92 and 106 in certain operations. This mechanism is shown particularly in Figs. 5 and 6 and is shown as aligned with the fifth actuator shaft 76c, counting from the right. It includes a shaft, or axle, 182 extending through, and journalled in, the transverse frame member 72 and an auxiliary plate 361 which is mounted on the frame member 72 by suitable spacing studs 362. This shaft 182 is in alignment with the actuator shaft 76c and carries a cam 183 rigidly mounted thereon, adjacent the rear side of the frame member 72. A jaw clutch element 184 is mounted on the shaft 182, at the front side of the frame member 72, and a shiftable driving clutch element 185 is mounted on the rear end of actuator shaft 76c for driving engagement with the clutch element 184. A clear clutch control rod 186 extends slidably through the transverse frame plates 70 and 140. A yoke 187 on the rear end of rod 186 engages the shiftable clutch element 185 for shifting this clutch element into, and out of, driving engagement with the clutch element 184. A compression spring 188 surrounds the rod 186 between the front side of the transverse frame plate 70 and an abutment washer 189 secured on the front end of rod 186, and urges this rod forwardly, i.e., in a direction to keep the clutch element 185 out of engagement with the clutch element 184. The shaft 190, already mentioned in connection with arm 181 and pusher link 199 of the automatic left shift mechanism previously described, is also used for initiating automatic clearing. An arm 192 (Figs. 5 and 16) is secured to this shaft near the left-hand end thereof. A pusher link 193 is pivotally connected at its front end to this arm and bears at its rear end against the front end of rod 186. The shaft 190 is rocked by various control keys, for example, the dividend entry key 46, which involve programmed operations not here pertinent, but which include the simultaneous clearing of the register and the shifting of the carriage B to its extreme left-hand position. When shaft 190 is so rocked, the arm 181 adjacent the left shift clutch control rod 168 moves its link 199 rearwardly, thereby forcing the left shift clutch control rod rearwardly to cause engagement of left shift clutch members 160, 162. Simultaneously, the rocking of the shaft 190 rocks arm 192 adjacent the clear clutch control bar 186, thereby forcing link 193 rearwardly. This link, through its engagement with the front end of bar 186, will move the clutch control bar 186 rearwardly to cause engagement of the clear clutch 184, 185.

It will be noted (as shown in Figs. 5 and 6), that in the present invention, I prefer to provide means which prevents the operation of the clutch 184, 185 until the carriage has reached its terminal left-hand position. This is readily accomplished by making the clutch control rod 186 in two portions, one of which is notched (as shown in Fig. 5) to embrace a tongue in the other. A strong compression spring 367 is positioned between collars on the respective portions of the two rods, as shown, so that movement of the forward portion would normally move the rear section in a like manner. Associated with the yieldable bar 186, I provide a bellcrank 360 (see particularly Fig. 6), which is rockably mounted on the rear auxiliary bracket 361 by any suitable means, such as on the right-hand spacer stud 362. The upper arm 363 of the bellcrank 360 lies in the path of a pin 364 riveted on, or otherwise rigidly secured to, the rack 141, and is adapted to be engaged by this pin as the carriage is shifted into its extreme left-hand position (to the extreme right in Fig. 6, which is a rear view of this portion of the mechanism). The lower, or horizontal, arm 365 of the bellcrank 360 is provided with a forwardly extending ear 366 normally lying behind the yoke 187 which connects the clutch control rod 186 to the shiftable component 185 of the jaw clutch 184, 185, thereby preventing rearward movement of the rod to the clutch engaging position. This bellcrank is biased to this locking position by a suitable spring 368 which urges the bellcrank (in a counterclockwise direction when viewed from the rear, as in Fig. 6) to its blocking position in which the ear 366 lies behind the yoke 187. However, when carriage B shifts to the extreme left-hand position, the engagement of pin 364 with the upper arm 363 of the bellcrank, rocks the ear away from engagement with the yoke 187 (clockwise when viewed from the rear). Thereupon the rear portion of the clutch control rod 186 is free to move rearwardly from the force of spring 367 to cause engagement of the clear clutch 184, 185. Incidentally, it is conventional to provide, in machines of the kind described, a linkage which is controlled by the rocking of shaft 190 to cause operation of the clutch and switch operating link 128 (Fig. 4) to cause the engagement of the main clutch 116 and close the motor switch 115. This mechanism, as illustrated, includes a bellcrank 308 mounted on the right end of the shaft; a pin 310 on the end of the rearward arm of the bellcrank which overlies the cam edge 311 on the extreme rear end of switch operating arm 312; and a pin 316 on the lower end of switch arm 132 which is engaged by cam projection 315 of arm 308, as is conventional in the machine illustrated by the above-mentioned patents.

A cam operated lever, or follower, 194 (Figs. 5 and 6) is pivotally mounted at its lower end on the transverse frame plate 72 by a pivotal mounting 195. The arm carries a roller 196 bearing on the edge of the cam 183, while a spring 197 maintains the roller 196 in engagement with the cam 183, so that lever 194 is rocked each time the cam rotates. The upper end of the lever 194 is notched to embrace a pin 198 projecting from the intermediate portion of a clear slide 200 mounted on, and extending longitudinally of, the crossframe plate 72, thereby imparting longitudinal reciprocatory movement to the slide when the cam 183 rotates. A tongue 201 projects upwardly from the intermediate portion of the slide 200, which tongue is provided at its upper end with a forwardly extending ear (as shown in Fig. 5).

Cooperating with the ear of tongue 201 is a link, or interponent, 202 (Fig. 6), which is pivotally mounted on a clearing slide 203. The clearing slide 203 is slidably mounted on, and extends longitudinally of, the rear side of carriage frame 82. When the carriage is in its extreme left-hand position, the left-hand end of the interponent is disposed immediately to the right of the tongue 201, in opposition to the tongue. The link 202 carries a lifting pawl 204 which engages a fixed abutment 205 to hold the right-hand end of the link out of position for engagement by the tongue 201 as the carriage is moved into its leftmost position. When the carriage reaches its limiting left-hand position, tongue 201 engages the link 202 to effect a reciprocation of slide 203 against the tension of spring 650 which normally holds the slide to the left (to the right in Fig. 6). The right end of slide 203 (as shown in Fig. 11) carries a bellcrank interponent 353 which is positionable to engage either accumulator clear knob 100 or counter clear knob 112 to operate the respective clearing racks. The operation of the clear racks 98 or 111, respectively, simultaneously operates their respective zero stop slides 219 or 219' to positively stop the respective dials in their "0" positions. The means for controlling the operation of the bellcrank interponent will be described in connection with the program controls relating to the interregister transfer operations of the present invention.

9. Division programming mechanism

To perform a devision operation, the dividend is first set into the selection mechanism and is then entered additively into the product register, the operation of the counter register preferably being disabled for this entry. If desired, the entry of the dividend into the product register is carried out by a dividend tabulating mechanism set into operation by a dividend tabulating key 46 (Fig. 1), as fully disclosed in Friden Patent No. 2,403,273 listed above, to register the dividend ordinally with respect to a selected ordinal decimal position. After the dividend is entered into the product register, the selection mechanism is automatically cleared and the divisor is manually entered into the selection mechanism, and the division keys 47 and 48 are depressed. The key 48 reverses the counter drive, so that the sign character of registration in the counter during division will be unlike the sign character of registrations in the accumulator, and the key 47 trips off the division mechanism.

A trigger arm 222 (Fig. 7) is pivotally mounted at its lower end on the right-hand control plate 223 and is provided with a latching shoulder 229. A division actuator lever 206, of bell-crank shape, is pivotally mounted at its angle on a stud 525 on the right-hand control plate 223 and has one arm 207 extending past the trigger arm 222. A strong spring 208 is tensioned between the forward arm 207 and the frame plate, thereby biasing the lever 206 to an operative position (in a counter-clockwise direction as viewed in Fig. 7). At its extremity, the arm 207 carries a roller 210 adapted to rest on the shoulder 229, thereby holding the lever 206 in the cocked, or inoperative, position shown in Fig. 7. When the trigger arm 222 is, in a well-known manner, rocked by a depression of the divide key 47, the shoulder 229 is moved out from under the roller 210, thereby freeing the division actuator lever 206 from restraint so that it will be rocked by its spring 208. The division actuator lever 206 has a second arm 211 extending upwardly past the main drive shaft 77, which is provided at its upper end with a cam edge 212. A stud 213, carried by a gear 214 mounted on the main drive shaft 77, engages the cam edge 212 near the end of the first operating cycle established by operation of the division key 47 and restores the division actuator lever 206 to its latched, or cocked, position.

A division control lever 215 (Fig. 8) is disposed at the inner side of the control plate 223. It is pivotally mounted, intermediate its length, on the upper end of a division program lever 216 by a pivotal mounting 217. The lever 216 is pivotally mounted at its lower end on the control plate 223 by a pivotal mounting 239 and is provided with an aperture 218 of substantially rectangular shape. A division program shaft 220, extending transversely of the machine, extends through this aperture and carries an eccentric cam 221 which bears against opposite sides of the aperture 218 to control the rocking movement of lever 216 about its pivotal mounting 239 and the reciprocatory movement, therefore, of lever 215 when the shaft 220 rotates. At its forward end, lever 215 is connected by a link 638 to the rear end of one arm 637 of bellcrank 635 pivoted at 636 on side frame plate 223. The vertical arm 640 of bellcrank 635 abuts pin 641 on slide 642, which is slidably mounted on frame plate 223 as previously described. Thus, the clockwise rocking of lever 215 serves to move the slide 642 rearwardly (or to the left as viewed in Fig. 8), to move the clutch control pin 135 rearwardly and thereby engage the clutch and close the motor contacts, as more fully described in Patent No. 2,327,981. A pin 224 which pivotally connects the lower end of link 638 to the forward end of lever 215, projects through an aperture 225 in control plate 223 and underlies the arm 207 of the actuator lever 206, so that lever 215 is rocked (clockwise in Fig. 8) by the power of spring 208 when trigger 222 is rocked (clockwise in Fig. 7) out of latching engagement with roller 210.

At its rearward end, the division control lever 215 is provided with a notch 226 flanked on the rear side by a cam edge 227, so that when lever 215 is rocked by spring 208, this edge engages a pin 228 projecting from the slide 230 which controls the position of the add-subtract gate 136. The notch 226 is so located relative to pin 228 and the cam edge 227 is so inclined that when the lever 215 is rocked (clockwise in Fig. 8), with shaft 220 and lever 216 in their normal, or full-cycle, positions, the add-subtract gate will be moved forwardly to its subtract position, and the machine will be conditioned for subtraction of the divisor in the selection mechanism from the dividend in the product register.

A hook-shaped latch 232 (Fig. 9) is mounted on the frame plate 126, near the rear end of lever 215, by a pivotal mounting 233. The latch is urged in a clockwise direction (as viewed in Fig. 9) by a spring 234 into engagement with a flattened pin 235 projecting from lever 215 near the rear end thereof, and holds the lever in its operative position until the hook is automatically or manually released from the pin. As long as lever 215 is held in its rocked, or division, position, the main clutch 116 is maintained in engagement and the motor switch 115 is maintained closed even though the division key 47 has been released. The hook 232 can be manually released from the pin 235 by a division stop lever, not illustrated, but well-known to the art. The hook is automatically released by engagement of an angular lever, or live point, 236 (Figs. 9 and 26) pivotally mounted on the underside of the carriage frame bar 82, as by a pivot screw 618, at the right-hand end of the bar and urged by a spring 237 tensioned between a stud on arm 617 of live point 236 and a stud 620 on the underside of the carriage frame bar 82, against a movable stop 238 (Fig. 26). This live point engages the side of hook 232 as the carriage shifts to its extreme left-hand position—the live point rocking against the force of its spring. Then, in the overdraft correction cycle in that ordinal position, the rearward shifting of division control lever 215, as will be described hereinafter, pulls the upper end of the latch 232 forwardly, so the live point rocks in behind it. Finally, in the attempted left shift in this ordinal position, the return of the control lever 215 to its shift position forces the pin 235 off the hook, and the lever releases the bellcrank 635 to its inoperative position and terminates machine operation.

A shaft 240 (Fig. 8) extends transversely of the machine, being journalled at its right-hand end in the plate 223. It carries an arm 241 rigidly mounted thereon adjacent the division control lever 215, the forward end of which arm bears on a stud 242 on lever 215. Thus, the rocking of lever 215 (clockwise in Fig. 8) rocks shaft 240 in the opposite direction. Conventionally, the rocking of shaft 240 conditions means for positioning the division programming flag 244 (Figs. 2 and 5) for operation upon the occurrence of an overdraft in the product register, as fully shown in Friden Patent No. 2,327,981, mentioned above. This conditioning mechanism is not pertinent to the present invention and hence is not described here. It should be noted, however, that the flag 244 is pivotally mounted on the shaft 220 but is secured against relative movement longitudinally of this shaft. When the flag 244 is rocked (clockwise in Fig. 2) in response to an overdraft in the product register or by means to be described hereafter, the tail portion 245 of the flag is moved into the rotational path of a lug 246 carried by a disk 247 mounted on the extreme left-hand actuator shaft 76d.

When the lug 246 engages the tail 245 of the flag 244 near the end of an operating cycle of the machine, the flag and the shaft 220 are shifted to the right (as viewed in Fig. 5). As shown in Fig. 7, a mutilated gear 250 is mounted on the right-hand end of shaft 220 at the outer side of frame plate 223, which gear has three uniformly spaced-apart sets of gear teeth with three teeth in each set. A mutilated driving gear 251 and a gear 252 are mounted in side-by-side relationship on a stub shaft 253 supported by the frame plate 223 and are drivingly secured together, the gear 252 meshing with the gear 214 rigidly mounted on the main drive shaft 77. Gears 214 and 252 are of equal size, so that gears 252 and 251 are driven through one complete rotation during each operating cycle of the machine. The gear 251 has one set of two gear teeth, and is spaced outwardly from the frame plate 223 so that normally it is out of position to mesh with the gear 250. However, when shaft 220 is shifted to the right by flag 244, as described above, gear 250 is moved out into position to mesh with gear 251. Because of the tooth arrangement on gears 250 and 251, gear 251 will turn gear 250 one-third of a rotation, or 120°, for each complete rotation of gear 251. Gear 250 is held in the plane of gear 251 for three successive cycles of the machine by a pin 254 projecting out from the frame plate 223 to engage the inner face of the gear 250. The gear 250 has a notch 255 which receives the pin 254 when the gear is in the full-cycle position shown, thereby enabling compression spring 256 (Fig. 5) acting between shaft 220 and the left-hand frame plate 257, to move the gear 250 back to its normal position where it cannot mesh with the gear 251.

During the first one-third rotation of gear 250 and shaft 220 following an overdraft, which rotation occurs near the end of the subtraction cycle which produced the overdraft and the beginning of the subsequent cycle, cam 221 (Fig. 8) shifts levers 216 and 215 rearwardly to move the add-subtract gate from its subtraction to its addition position. In the ensuing addition cycle of the machine, the divisor (the subtraction of which caused the overdraft) is restored additively to the dividend, cancelling the overdraft. During the next one-third rotation of cam 221, near the end of the restore cycle, the add-subtract gate 136 is moved to its neutral position in which the dial rotating gears 93 are clear of the gears on the spools 81. Thereupon a cam, not illustrated, on shaft 220 operates in a well-known manner through suitable linkage, also not illustrated, to move the left shift control rod 168 rearwardly and engage the left shift clutch 160, 162 to step the shiftable carriage one order to the left. During the third one-third rotation of the gear 250, which occurs near the end of the shift cycle and beginning of the subsequent cycle, the levers 216 and 215 are rocked back to their original division position and gear 250 is turned to its full-cycle position in which notch 255 receives pin 254, freeing gear 250 to be moved by spring 256 out of mesh with gear 251. A series of subtraction operations of the machine is thus initiated in the lower order. This repeated subtraction is continued in the lower order until an overdraft occurs, which programs a restore cycle, a left shift cycle, and reinitiation of subtraction cycles in the adjacent order, until the carriage reaches its extreme left-hand position, unless operation of the machine is manually terminated before this occurs.

10. Interregister transfer gear mechanism

For transferring values between the product register and the counter register, each product register dial shaft 91 (Fig. 2) carries, preferably within the hollow carriage frame 82, a bevel gear 258. A series of ordinarily arranged shafts 259 is journalled in the front wall of the carriage frame, below the coordinal counter dial shafts 105, each with its rotational axis perpendicular to the rotational axis of the coordinal dial shaft 91. The shafts 259 are slidably mounted in the carriage frame for limited longitudinal movement of the shafts relative to the carriage frame. Each such shaft 259 carries a bevel gear 260 at its rear end, which gear is meshingly engageable with the coordinal bevel gear 258 on the accumulator dial shaft 91. The shaft 259 has, at its front end, a flat head 261 providing an annular flange around the front end of the shaft. Each counter dial shaft 105 carries, intermediate its length, a spur gear 262 rigidly mounted thereon, which gear is constantly in mesh with a spur gear 263 rigidly mounted on the coordinal transfer shaft 259. The gears 262 are wide enough for the gear 263 to remain in mesh therewith regardless of the longitudinal movements of the shafts 259. With this arrangement, when the gears 260 are in meshing engagement with the coordinal gears 258, a value standing in the product register can be transferred to the counter register by zeroizing, or clearing, the product register, and a value standing in the counter register can be transferred to the product register by clearing, or zeroizing, the counter register.

A trough-shaped bail 264 (Figs. 2, 11, 12 and 14) extends transversely of the machine and is provided with a series of ordinally arranged notches for receiving the shafts 259 adjacent the heads 261. The bail 264 is pinned at its left end (Figs. 18 and 23) on a stub shaft journalled in a bracket 427 secured on carriage frame 82, and at its other end is pinned on a shaft 264' (Fig. 12) journalled in a bracket 627 on carriage frame 82 and adjacent its end in the carriage end frame 406 (Figs. 12 and 13). At its outer right end, the shaft 264' supporting that end of bail 264 carries a crank 265 which is normally urged rearwardly (counter-clockwise in Fig. 13) by a spring 405 to normally maintain gears 260 out of engagement with dial shaft gears 258. The lower end of crank arm 265 is provided with a crank pin 266, the outer end of which is tapered to facilitate the engagement of the pin with a notch 267 in the upper end of a lever 268 (Figs. 10, 25 and 27) upon movement of the carriage into its leftmost position. Lever 268 is pivotally mounted on a suitable stud 396 mounted on the right side control plate 223, and is operative to control the rocking of the bail 264 to engage the gears 260 with gears 258 when the carriage is in its leftmost position, as will be described hereinafter.

The counter register actuator is disabled during either interregister transfer operation, by means well-known in the art, under the control of the plus-minus gate 136.

11. Accumulation of grand totals in the counter register

In the solution of certain problems, it is desirable to be able to obtain grand totals by accumulating, in the counter register, values obtained successively in the product register of the machine. When desired, this operation is obtained by depressing the "accumulate" key 53 (marked "Accum" in Fig. 1) to effect addition of the value in the counter register to the value in the product register and the transfer of the total back into the counter register for storage.

As shown in Fig. 19, the key 53 comprises an elongated bellcrank, or key lever, 285 extending longitudinally of the machine. The key lever 285 is mounted near its rear end by means of a collar 289 that is pinned to, or otherwise rigidly mounted on, a shaft 271 that is journalled in the left-hand keyboard supporting plate 281 and the left-hand frame plate 257. The rear end portion 287 of lever 285 is inclined rearwardly and downwardly from the shaft 271, as shown. A spring 288, connected between the rear end of lever 285 and the fixed plate 281, resiliently urges the lever upwardly to maintain the key 53 in its normal, inoperative position. A key top 286 is carried on the upturned front end of lever 285. Extensions 300 and 301 project downwardly from the front portion of lever 285 in spaced-apart relationship along the lever, and carry, near their lower ends, perpendicularly projecting pins 297 and 299, respectively.

A shaft 276, disposed below, forwardly of, and substantially parallel to, the main power shaft 77, is journalled near its opposite ends in the left-hand frame side plate 257 and the intermediate frame plate 281. Shaft 276 carries, near its right-hand end, an upstanding hook 298 having a forwardly directed nose 309, and, at its left-hand end, an upstanding arm 295. A spring 296 connected between the arm 295 and the fixed plate 257 forwardly of the arm, urges the shaft 276 to rock to its operative position (in a clockwise direction as viewed in Fig. 19). When the key 53 is in a raised position, the front end of nose 309 at the upper end of hook 298, bears against pin 297 and restrains spring 296 from rocking shaft 276. When key 53 is manually depressed, pin 297 is moved below the nose 309, and spring 296 then rocks shafts 276 and hooks 298 to swing the nose portion 309 over pin 297 and maintain key 53 depressed until shaft 276 and hook 298 are restored to their original position against the force of spring 296, as will be later described.

Referring now to Fig. 16, it will be seen that pin 299 extends into a slot 302 in the front end of a lever 303 pivotally mounted at its rear end on the frame plate 281 by a pivotal connection 304. This lever extends, near its front end, through an aperture in plate 281. An arm 305 extends downwardly and rearwardly at the rear end of lever 303 and carries, at its distal end, a roller 306 which bears against a cam edge 307 on the front edge of the arm 192 rigidly mounted on shaft 190. Depression of key 53 thus rocks lever 303, thereby rocking arm 192 and shaft 190 (clockwise as viewed in Fig. 16). The rocking of arm 192, acting through link 193 and control rod 186, conditions the power clearing clutch 184, 185 for engagement when the carriage is in its terminal left-hand position. The rocking of shaft 190 also rocks arm 181 (Fig. 15), which acts through link 199, pin 173 and control rod 168 to engage the left shift clutch 160, 162.

The bellcrank lever 308 (Fig. 4) is mounted at its angle on the right-hand end of shaft 190 and carries a roller 310 at the extreme end of its rearwardly directed arm. This roller engages a cam edge 311 of a bifurcated switch operating lever 312. The switch operating lever 312 is pivotally mounted at its front end on a fixed pivotal mounting 314. The lever 312 has a second cam edge 315, disposed at an angle to the cam edge 311 and bearing against an insulated pin, or roller, 316 which projects perpendicularly from the lower end of lever 132, for controlling closure of the motor switch 115. When lever 312 is rocked by lever 308, it moves the pin, or roller, 316 to close the motor switch 115 and to rock levers 132 and 130 to engage the main clutch 116. Thus, when key 53 is depressed, the machine is put into operation with the power clear clutch conditioned for engagement and the left shift clutch engaged.

A three-armed lever 320 (Figs. 17 and 19) is pivotally mounted at the juncture of its arms by a pivotal mounting 322 on frame plate 257, adjacent the rear of the machine. It has one arm 324 projecting upwardly, a second arm 325 projecting downwardly, and a third arm 326 projecting forwardly from the pivotal mounting 322. A link 327 connects the lower end of lever arm 325 to the upper end of the arm 295, so that when key 53 is depressed, and shaft 276 and arm 295 rock (in a clockwise direction in Fig. 17) from the force of spring 296, lever 320 is rocked (in a counterclockwise direction in this figure). The upper end of lever arm 324 is connected, by means of a link 330, to the lower end of a lever 328. The lever 328 is pivotally mounted, intermediate its length, on the frame plate 257 by a fixed pivotal mounting 331, so that lever 328 is rocked (clockwise) when lever 320 is rocked (counter-clockwise) as a result of the depression of key 53. Lever 328 constitutes one component of the transmission mechanism which carries the operation of the power-driven portion of the interregister transfer mechanism to the carriage carried registers.

Lever 328 is provided on its upper end with a cam formation 332 having a curved top edge which rides under the bottom edge of a lever 333 (Fig. 24) pivotally mounted at its right-hand end on the left-hand upper corner of the rear frame cross-member 72 by a pivotal mounting 334. As shown in Figs. 17 and 23, the pivotal mounting 334 is elongated in a direction away from the rearward side of the frame cross-member 72. A compression spring 335 surrounding this mounting between the lever 333 and the mounting head 336, resiliently urges the lever to a position adjacent the frame cross-plate 72.

The left-hand end (right end in Fig. 24, which is a rear view) of lever 333 is upwardly inclined and provides an upwardly facing terminal edge 337 which underlies a roller 338 carried near the distal end of one arm 340 of a three-armed lever 341 pivotally mounted at the juncture of its arms on the left-hand end (appears as right-hand end in Fig. 24) of the power clear slide 203 by a pivotal mounting 342. The lever 341 is so positioned along the carriage frame that the terminal edge 337 of lever 333 underlies roller 338 only when the carriage is in its terminal left-hand position. Thus, the rocking of lever 333 (counter-clockwise in Fig. 24) as a result of the depression of key 53, rocks the lever 341 (clockwise in Fig. 24) if the carriage is in its leftmost position at the time. If, on the other hand, the carriage is displaced from its leftmost position, so that lever 341 lies to the right of lever 333 (i.e., lies to the left of the position shown in Fig. 24, which is a rear view) when the key is depressed, the rocking of shaft 190, as previously described, initiates a left shift of the carriage. In that event, the roller 338 engages the sloping edge of arm 333, for arm 333 was elevated by the key depression, and thus the lever 341 is cammed to the rocked position as the carriage is shifted into the extreme left-hand position. Lever 333 is resiliently held against cam formation 332 by a spring 343, and lever 341 is biased to its normal position (i.e., the counter-clockwise position shown in Fig. 24) by a spring 344.

Lever 341 has an arm 345 extending upwardly from the pivotal mounting 342, which arm is provided with a terminal notch 346 which receives a lug, or tongue, 347 projecting from the rear edge of a clear control bar, or slide, 348 at the left-hand end of the slide. The slide 348 is slidably mounted on, and is carried by, the power-operated clearing slide 203 already described (see also Figs. 11, 12, 13 and 23), and is guided for longitudinal movement thereon by a pin 350 extending upwardly from the clearing bar through a slot 351 in the left end of the control bar. At its right-hand end, the control bar 348 is connected to one arm 352 (Fig. 11) of a bell-crank lever 353 which is pivotally mounted at its elbow on the right-hand end of the power clear slide 203 by a pivotal mounting 355. The other arm 356 of lever 353 is provided at its distal end with oppositely extending hook formations 357 and 358 that are alternatively and selectively engageable with the clearing knobs 100 and 112 for the product register and counter register, respectively.

When lever 341 is in the normal position to which it is urged by spring 344, lever 353 is rocked to engage its hook formation 357 with the product register clearing knob 100; and when lever 341 is rocked by lever 333 away from its normal position, the lever 353 is rocked (counter-clockwise in Fig. 11) to engage its hook formation 358 with the counter register clearing knob 112, as indicated by the phantom line. Thus when, subsequent to the movement of the carriage into its left-hand terminal position, the power clear slide 203 is translated to the right (by the operation of power clear cam 183, lever 194 and intermediate slide 200 as described above), such operation thereby clears, or zeroizes, either the product register or the counter register as controlled by the position of the lever 353 with respect to knobs 100 and 112.

In the operation of the machine under control of the counter register accumulate key 53, lever 328 cams lever 333 upwardly to rock lever 341 (in a clockwise direction, as viewed in Fig. 24) if the carriage is in its leftmost position at the time, or as it shifts into this position otherwise; and the rocking of lever 341 pulls the control bar to the left (Fig. 11), swinging lever 353 (counter-clockwise in Fig. 11), so that hook 358 engages the counter register clearing knob 112 during the clearing operation. If the carriage is in its leftmost position when key 53 is depressed, the counter register will be zeroized in the first machine cycle to transfer the value therein into the product register. However, if the carriage is displaced from its leftmost position, the depression of the key 53 causes the carriage to be shifted into its leftmost position, whereupon, in the machine cycle following the last shift cycle, the counter register is cleared into the product register.

As shown in Figs. 23 and 24, the third arm 455 of lever 341 carries a roller 456 which will pass through a notch 457 in the zero stop slide 219 when the lever 341 is rocked (clockwise to the phantom line position in Fig. 24) before the counter register clearing action begins. After this clearing action begins, the movement of the clearing bar 203 moves (to the left in Fig. 24) the notch 457 away from the roller 456, so that the roller runs along the bottom surface of the zero stop slide to maintain the lever 341 (Fig. 11) rocked and the hook formation 358 of lever 356 in engagement with the counter register clearing knob 112 until the clearing operation is completed.

A link 370 (Fig. 17) is pivotally connected at its forward end to connecting link 330, and at its rear end by a pin-and-slot connection 371 to a radial arm 372 rigidly secured on the left-hand end of a shaft 373. This shaft extends along the rear side of rear frame plate 72 and is journalled in bearing brackets 374 and 375 (Figs. 5 and 6) secured to the rear crossbar 72 adjacent the side frame 126 and 257. A spring 369, tensioned between a stud on link 370 and the pin carried by arm 372, resiliently biases the arm, and shaft 373, to follow any forward, or return, movement of the link. The depression of the key 53, by means of the forward translation of link 327 and rocking of lever 320, positively moves the connecting link 330 and consequently the link 370, to the rear (to the left in Fig. 17), thereby positively rocking arm 372 and shaft 373 (counter-clockwise in Fig. 17 and clockwise in Fig. 25) at the start of the accumulating operation.

Shaft 373 carries a radial arm 376 (Figs. 6 and 25) on its right-hand end, which arm is connected by a pin-andslot connection 378 to the rear end of a latch rocker 379 rockably mounted intermediate its length on the right-hand end of gate shaft 137. A bellcrank lever 381 is rockably mounted at its angle on a pivotal mounting 382 carried by the control plate 223 near the bottom edge of the latter. The bellcrank has a rearwardly extending arm 383, to the distal end of which a tension spring 384 is attached to resiliently bias the lever 381 to an operative position (in a counter-clockwise direction in Fig. 25). Lever 381 also has an arm 385 extending upwardly from the pivotal mounting 382 and having at its upper, or distal, end, a hammer formation 386 disposed rearwardly of, and adjacent to, the pin 266 carried by the radial arm, or crank, 265 on the right-hand end of the transfer gear control bail 264.

Latch rocker 379 has an arm 387 extending forwardly from shaft 137, which arm is provided near its forward end with a latching shoulder 388. The spring-powered lever 381 carries a pin 390 on its upper arm 385, the pin being adapted to engage shoulder 388 to latch the lever 381 in retracted position against the force of spring 384. When shaft 373 is rocked (clockwise in Fig. 25) upon depression of key 53, this rocks latch lever 379 (counter-clockwise) to disengage shoulder 388 from pin 390. This releases lever 381 and spring 384 to drive the hammer formation 386 against pin 266 to rock bail 264, if the carriage is in its terminal left-hand position, to thereby engage the transfer gears 260 with the co-ordinal gears 258 (Figs. 2 and 11). As this engagement occurs immediately before the beginning of the counter register clearing action, any value standing in the counter register will be transferred into the product register during the first part of this cycle, assuming that the carriage was in the extreme left-hand position at the time.

In the event the carriage is not in the extreme left-hand position at the time key 53 is depressed, then means is provided for operating the hammer bellcrank 381 in the very first part of the cycle immediately following the return of the carriage to that extreme position, and before the counter register clearing operation that occurs shortly after the start of the cycle. This mechanism includes a cam 391 (Figs. 10, 25, 28 and 29) journalled on the stub shaft 253 and drivenly connected to the gear 252, which is also journalled on this same stub shaft and is driven by gear 214 on the main drive shaft 77. The cam 391 has a lobe portion 392 of constant radius for approximately half the circumference of the cam, and a gradually inclined depression 393. A cam following roller 394 carried by the arm 385 rides on the peripheral edge of the cam 391. The lobe and recessed portions of the cam 391 are so angularly related to each other, and to the main drive shaft 77, that the lever arm 385 can be swung to its position to rock the bail 264 at the beginning of a machine operating cycle, and immediately starts to gradually move back to its inoperative, or bail releasing, position. This return takes about one-third of a cycle and is effected immediately at the end of the value entering, or register clearing, phase of the coincident operating cycle and just before the tens-transfer interval of such cycle begins. If the latch 379 were operative at this point, the lever 381 would be latched in its inoperative position. However, when operation is initiated by key 53, the lever 381 will not be relatched in operative position until the key 53 is released, for it is to be noted that, although lever 381 is rocked during each cycle of the machine after the key 53 is depressed, including the cycles used to return the carriage to its terminal left-hand position, it will have no operative effect until the carriage reaches its left-hand position, since, until then, the pin 266 will not be in position to be engaged by the hammer formation 386 at the upper end of lever arm 385.

The crank operating lever 268 (Figs. 10, 25 and 27) is associated with the setting crank 265, as previously stated, and is adapted to both operate (by other control means to be described) the crank in other operations and to restore it to its disconnecting position at the proper time in the cycle. This lever is pivotally mounted on the control plate 223 by a pivotal mounting 396 positioned below the bail 264, and has, in its upper end, the notch 267 which receives the pin 266 when the carriage reaches its terminal left-hand position. Means to be later described in detail, are provided to releasably hold this lever in its normal position in which the notch 267 is aligned with pin 266, so that the notch will receive the crank pin. It will be recalled that the crank pin 266 is resiliently held in its transfer gear disengaging position by spring 405 tensioned between the arm of the crank 265 and a stud mounted on the carriage end plate 406. Lever 268 carries a stud 398 below the notch 267 adapted to engage the shoulder of a locking lever 400 pivotally mounted at its rear end on shaft 137. The front end of the locking lever is adapted to move behind the stud 398 when bail 264 is rocked to mesh the interregister transfer gears, and positively hold the lever 268, and consequently the bail 264, in the gear-engaging position. A spring 401 tensioned between locking lever 400 and the fixed plate 223, rocks the locking lever to stud-engaging position whenever lever 268 is rocked with bail 264 to permit such latching movement. The latch 400 is moved to its disengaging position by a stud 403 carried by cam 391, which stud engages a depending tail portion 404 of locking lever 400 to rock this lever out of stud-engaging position at approximately the half-cycle position, after completion of the return movement of lever arm 385 to its inoperative position. Immediately after the locking lever 400 is released from the stud 398, the cam carried stud 403 engages a tail portion 407 of lever 268 depending from the pivotal mounting 396, and rocks lever 268 (clockwise in these figures) to restore the lever 268, crank 265 and bail 264 to their normal, disengaged, positions. It can be mentioned at this point that while the bail and lever will be returned to their normal, disengaged positions by the force of spring 405, there is also some spring pressure biasing the lever 268 to the engaging position (shown in Fig. 10), so that it is better to positively drive the lever and bail to their normal positions. Such restoration of lever 268 (clockwise from the position of Fig. 10 to that of Fig. 25) moves the stud 398 under the front end of the locking lever 400, so that this lever cannot re-engage the stud during the same operating cycle of the machine. Thus, the carriage is first returned to its terminal left-hand position if displaced therefrom, and then, during the first machine cycle after this return of the carriage, the counter register is cleared and any value standing therein is transferred into the product register during the value entering, or digitation, phase of the coincident cycle.

Referring now to Figs. 5, 17, 19, 20 and 21, a pin gear 410 is journalled on a stub shaft 411 which projects from the left-hand frame plate 257, adjacent and parallel to the main drive shaft 77. A gear 412 on the main drive shaft constantly meshes with, and therefore continuously drives, the gear 410. The gear 412 is smaller than the gear 410, the gear ratio being such that the gear 410 is driven through one complete rotation for each three complete rotations of the drive shaft 77 and gear 412. The gear 410 has three apertures extending therethrough at equal distances from the rotational center of the gear and at equal angular intervals apart; in which apertures the respective pins 413, 414 and 415 are slidably disposed for longitudinal shifting movement therein. These three pins are also slidably mounted in a plate 417 secured to the gear 410 in spaced relationship thereto as by spacing studs—the plate being provided with apertures aligned with those of the gear so that the pins can slide in both. The slidable pins are resiliently detented by an annular spring 416 in one or the other of two positions, in one of which they project from the outer face of gear 410 and in the other of which they project from the inner face of the plate 417 toward the frame plate 257. The spring 416 extends around the three pins, as best shown in Fig. 17, the spring 416 engaging in spaced-apart, annular grooves in each of the pins (Fig. 20).

A bellcrank lever 418 is pivotally and slidably mounted at its angle on an elongated stud 419 projecting outwardly from the frame plate 257 adjacent the gear 410. This lever has one arm 420 overlying the gear 410 and a second arm 421 projecting upwardly from the pivotal mounting stud 419 to a location adjacent the front side of the carriage frame bar (see Fig. 17). A link 422 connects the lever arm 420 to the third arm 326 of the three-armed lever 320, so that the lever 418 is rocked (in a counter-clockwise direction as viewed in Figs. 17 and 21) when the key 53 is depressed. The third arm 326 of lever 320 extends forwardly from the pivotal mounting 322 in a plane adjacent the inner face of the plate 417 and is provided with a cam edge 424 spaced directly below the gear shaft 411. This cam edge is adapted to be engaged by an inwardly projected pin 413 moving to the position shown for pin 415, thereby rocking lever 320 (clockwise in Fig. 17) at the end of the second cycle of operation. The distal end portion of the lever arm 420 lies between the positions of pin 413 and pin 414, and lies approximately halfway between pins 413 and 414. The lever 418 is biased to its extreme lef-hand, or normal, position by a compression spring 425 (Fig. 5) which embraces pin 419 and is seated against the inner face of the lever and outer face of plate 257. In the extreme left-hand position, the arm 420 lies immediately to the left of the normally outwardly projecting pins 413, 414 or 415 (as shown in Figs. 5 and 20).

As shown in Fig. 18, an arm 426 is pivotally mounted at one end on a bracket 427 on the carriage by a pivot screw 428. The arm 426 has its upper edge formed as a convex cam edge bearing against a pin 429 projecting perpendicularly from the left-hand end of the counter register clearing rack 111. The arm is resiliently held against the pin 429 by a spring 430, and is rocked downwardly about the pivot screw 428 when the clearing rack 111 is moved to the right relative to the fixed portions of the carriage, to clear the counter register. A dog, or live point, 431 is pivotally mounted on the arm 426 by a pivot pin 432 and is urged by a spring 433 against a stop pin 434 carried by the arm. This arrangement is such that when the carriage shifts into its leftmost position, the dog 431 yields to pass over the upper end of lever arm 421 and resumes the position shown in Fig. 18 relative to arm 421 if that arm has been rocked from its normal position, shown in full lines in Fig. 21, to the operative position, shown in phantom, in which it is interposed into the path of travel of the dog, or pawl. Normally, the upper end of arm 421 lies forwardly of the pawl, or dog, 431 (as shown in Figs. 17 and 21), but the rocking of lever 320 and consequent rocking of lever 418 (counter-clockwise in both figures) moves the end of the arm into the path of travel of the dog, as indicated by the phantom line in Fig. 21. Then, when the counter register is cleared during the first machine cycle after the carriage reaches its left-hand position, the rocking of arm 426 (counter-clockwise in Fig. 18) from the camming effect of pin 429, moves pawl 431 to the right, the right-hand end of the pawl 431 then being against the left-hand side of the upper end of lever arm 421 (as seen in Fig. 18). Such movement of the pawl shifts lever 418 to the right and sets pin 413, which, at this point in the cycle underlies lever arm 420, to its inwardly projecting position.

It will be recalled that key 53 is latched in its depressed position, and it will therefore maintain the machine in operation for successive cycles until the key is released.

It has been mentioned heretofore that when the carriage reaches the extreme left-hand position, the value in the counter register is cleared into the accumulator register, as just described, and that, immediately following this phase, the tens-transfer in the accumulator is operated. This operation of the tens-transfer mechanism takes place in the latter part of this clearing cycle, and involves the timed operation of the plus-minus, or digitation control, gate 136, as will now be described.

A bellcrank lever 440 (Figs. 5 and 17) is mounted at its angle on a pivotal mounting 441 carried by the frame plate 257 below, and forwardly of, the mounting stud 419. Lever 440 has a forwardly extending arm 442, which, at its end, is provided with a cam-shaped lower edge positioned above the shaft 411 adjacent the inner face of plate 417 and lying in the path of travel of a projected pin 413. At approximately the midpoint of the first machine cycle, i.e., immediately following the counter register clearing phase of the cycle and prior to the tens-transfer phase, an inwardly projected pin 413 engages the cam edge of arm 442 to rock the lever 440 (in a counter-clockwise direction as viewed in Fig. 17). Lever 440 has a second arm 443 extending upwardly from the pivotal mounting 441 which is connected at its upper end to one end of a link 444. The other end of this link carries a pin 451 which is embraced in a slot 445 in the upper end of an arm 446 rigidly mounted on, and extending upwardly from, the left-hand end portion of the digitation control shaft 137. The slot 445 is long enough to permit movement of the shaft and gate by other means to the addition position of the gate without operating link 444 and lever 440, or to permit the latching of the shaft and gate in the addition position while permitting the link 444 and bellcrank 440 to return to their normal centralized position. An arm 450 is rotatably mounted on, and extends upwardly from, the shaft 137 adjacent the arm 446, which arm has an aperture closely embracing the pin 451 without lost motion, so that the position of arm 450 always corresponds to that of link 444 and bellcrank 440. The upper end of arm 450 carries an abutment formation 452 lightly held against the forward side of the cam lever 333 by a relatively light spring 453. When lever 440 is rocked, at approximately the midpoint of the first machine cycle, with the carriage in its terminal left-hand position, arms 446 and 450 are positively rocked (in a counter-clockwise direction as viewed in Fig. 17). The rocking of arm 446 rocks the digitation control shaft 137 and the gate 136 to their additive positions, in which position they are held by the engagement of pin 413 with arm 420 until nearly the end of the cycle and by a conventional interlock until the end of that cycle. This rocking of arm 446 and shaft 137, to engage the plus gears 95 with the dial shaft gears 93, enables effective operation of the tens-transfer mechanism in the latter part of this cycle. At the end of this first cycle, conventional means become effective to centralize the plus-minus gate and restore lever 440 and arm 450 to their normally inactive position as pin 413 will have passed out from under arm 442. The simultaneous rocking of arm 450 moves cam lever 333 rearwardly (Figs. 5, 17 and 24) against the force of spring 335, to a position in which lever 333 no longer cooperates with the pin 338. The movement of lever 333 away from pin 338 frees lever 341, so that it is rocked (in a counter-clockwise direction as viewed in Fig. 24) by its springs 344 to its normal position. The lever 333 is prevented from later operating arm 341, as the rearward movement of arm 333 has permitted the arm 341 to rock in front of arm 333, thereby locking arm 333 in its rearward position until the arm 333 is released by cam lever 328. This rocking of lever 341 moves slide 348 (to the right in Fig. 11 or left in Fig. 24) to swing lever 353 (Fig. 11) to engage the hook formation 357 of this lever with the product register clearing knob 100.

Under these conditions, the product register is cleared during the first portion of the second cycle with the carriage in its terminal left-hand position. The locking of key 53 in its depressed position holds latch 379 (Fig. 10) in its inoperative position, leaving operating lever 381 free to rock by the continued rotation of cam 392. Since the roller 394 on lever arm 385 (Fig. 10) will again ride into the low portion of cam 391 under the influence of spring 384 at the beginning of this second cycle, lever arm 385 rocks bail 264 (clockwise in this figure) to re-engage the inter-register transfer gears, so that the accumulated value cleared out of the product register will be transferred back into the counter register. With this method of operation, grand total values can be accumulated in the counter register by transferring grand total values from the counter register to the product register for addition to values in the product register and the necessary tens-transfers, and then transferring the new grand total values with tens-transfers completed, back into the counter register—the entire operation being automatically carried out by depression of the counter register accumulator key.

During the second cycle of the drive shaft 77 with the carriage in its terminal left-hand position, and the pin 413 (Fig. 17) is rotating from the 120° to the 240° position of pin 415, the inner end of the set pin 413 engages the cam edge 424 (Fig. 17) of the lever arm 326, and rocks lever 320 (in a clockwise direction as viewed in Fig. 17). Lever 320, acting through link 327, rocks shaft 276 and hook 298 to release key 53 and terminate the operation of the machine at the end of this cycle, with the pin 413 in the position of pin 415. The actual release of the key 53 takes place substantially at the end of the cycle, but this is not particularly critical for the conventional full-cycle mechanism described in connection with the main clutch, prevents termination of machine operation before the full-cycle position is reached.

A fixed pin 439 (Figs. 5 and 20), having a beveled outer end, is positioned coaxially with pin 413 in Fig. 17 and serves to engage the inner end of any one of the inwardly projected pins 413, 414 or 415 and force them outwardly, thereby restoring the set pin or pins to the normally inactive position thereof in each full-cycle position of the main clutch 116 and therefore the full-cycle position of drive shaft 77. While the pin 413 will not have been restored at the end of the two-cycle operation, it will be at the end of the first succeeding cycle, but cannot interfere with the operation of the machine in that cycle so there is no necessity of restoring it earlier.

It will be noted that, while the left shift clutch is held in engagement during the two cycles after the carriage has been returned to its terminal left-hand position, this will exert no effort to move the carriage further since the shift pins 152 will merely rock the override pawl 144. However, I prefer to add means to positively restrain the carriage against slight movements to the right while the counter and product registers are being cleared. To secure this effect, a lever arm 435 (Figs. 17, 19 and 20) is pivotally mounted on, and extends rearwardly from, the shaft 271. This arm carries a pin seating one end of a spring 436, the other end of which is seated on a pin on the free end of an arm 313. The spring normally serves to maintain the pin on arm 435 in engagement with the extended end of arm 313, which arm is carried by a hub 291 pinned on shaft 271 (see also Fig. 22). A notch 438 is provided in the front edge of the carriage rail 87 and is so positioned along the carriage that the rear end of lever 435 may enter the notch when the carriage reaches its terminal left-hand position to restrain the carriage against movement away from this position during register clearing operations. Therefore, when key 53 is depressed, arm 313 is rocked (clockwise in Figs. 17 and 19) to tension the spring 436, thereby urging the rearward end of the arm 435 against the under side of the front edge of the carriage rail 87 when the carriage is displaced from its leftmost position. When the carriage is moved to its terminal left-hand position the rear end portion of lever 435 enters the notch in the carriage rail 87 and restrains the carriage against movement until the arm 313 and lever 435 are rocked downwardly.

12. *Counter register to product register transfer mechanism*

When it is desired to transfer a value from the counter register into the product register without having such value transferred back from the product to the counter register, key 52 (Figs. 1 and 19), marked "Ctr to Pro," is depressed. Key 52 comprises an elongated key lever, or bar, 270 rockably mounted near its rear end on the left-hand end of shaft 271. The lever 270 carries a key top 272 on its upwardly turned forward end and a projection 273 extending downwardly from adjacent the front end of the lever. This projection carries, near its lower end, a perpendicularly extending pin 274. A hook arm 275 is rockably mounted at its lower end on shaft 276, near the frame side plate 257, and has a forwardly directed top portion 269, the front end, or nose, of which normally bears against the rear side of pin 274 but which overrides pin 274 to latch key 52 down when this key is manually depressed.

An arm 294 is fixed on shaft 276, and a spring 277 connected between the distal end of this arm and hook 275 urges the hook to rock clockwise (as viewed in Fig. 19) to key latching position and provides the necessary flexibility to permit shaft 276 to rock without rocking hook 275 when key 53 is depressed. Engagement of a pin 284, which may also serve as a seat for spring 277, projecting perpendicularly from the distal end of arm 294 with hook 275, moves the hook to key releasing position at the end of machine operation established by depression of key 52.

The hub 290 (Figs. 19, 20 and 22) of key lever 270 is rockably mounted on shaft 271 and is notched, or recessed, to provide angularly spaced-apart, radial shoulders, one of which is designated at 293. The hub 291 of lever 313 is pinned on shaft 271 and is provided with a complimentary shoulder, or tooth, 292 opposed to shoulder 293, so that shaft 271 will be rocked to depress key 53 when key 52 is depressed, but key 53 can be depressed, and shaft 271 rocked, without coincidental depression of key 52. Thus, the depression of either key 52 or key 53 is effective to rock shaft 271 and arm 313 pinned thereto. This arm is resiliently connected to the lever 435 by means of spring 436, as explained above. The rocking of the shaft, therefore, resiliently urges the rear end of lever 435 into notch 438 in carriage rail 87 when the carriage is in the leftmost position, or immediately after it reaches its left-hand position, as described above.

Key lever 270 has a rearward extension 278 inclined downwardly and rearwardly from shaft 271, which carries, near its distal end, a pin 279 projecting perpendicularly to the left therefrom. A spring 280 tensioned between another pin carried by the lever extension 278 and a pin projecting outwardly from the frame plate 257, resiliently urges the lever 270 to rock in a direction to raise the key 52 to its upper, normal position.

A three-armed lever 282 (Figs. 5, 17, 19, 20 and 21) is provided with an elongated hub at the juncture of its arms to rockably and slidably mount lever 282 on a pivot pin 283 projecting outwardly from the frame plate 257. The lever 282 is urged to a limiting position, away from plate 257, by a compression spring 321. One arm 317 of this lever is provided with a terminal notch receiving pin 279, so that lever 282 is rocked (counter-clockwise as viewed in Figs. 17 and 19) when key 52 is depressed. A rearwardly extending arm 318 of lever 282 has, at its terminal end, a foot formation 319 which engages behind, or to the right of, lever arm 418 when lever 282 is rocked counter-clockwise. The third or depending, arm 329 of this lever is moved by the rocking of lever 282 (counter-clockwise in Fig. 17) to a position overlying the outer end of pin 414 at approximately the 180° position of the first machine cycle with the carriage in its leftmost position, that is, after about 60° rotation of gear 410.

It will be recalled that when key 53 is depressed, as it is by depression of key 52, key lever 285 is rocked to condition the clear clutch 184, 185 for engagement, to engage the left shift clutch 160, 162, and to engage the main clutch and close the motor contacts. The depression of the key 52 and the rocking of levers 270 and 285 also enables spring 296 to rock lever 320 (counterclockwise in Fig. 17) to rock clearing selection bellcrank, or hook, 353 (Fig. 11) so that hook 358 engages counter clear knob 112, and thereby to control the clearing of the counter register. The rocking of lever 320 also releases latch 379 (Fig. 10) and thereby enables lever 385 to control the engagement of the interregister transfer gears. With key 52 depressed, and during 180° of the first machine cycle with the carriage in its leftmost position or immediately allowing the return of the carriage to its leftmost position, live point 431 (Fig. 18), which is under control of the counter register clearing rack 111, moves lever 418 and therefore lever 282 to the right (Figs. 17, 19 and 20) to set a corresponding pin 414. The set pin 413, or a similarly angularly positioned pin, rocks lever 440 (Fig. 17) to engage plus gears 95 with dial shaft gears 93 immediately following the clearing of the counter register and prior to the tens-transfer phase of the cycle.

As the machine completes its first cycle with the carriage in its terminal left-hand position, the counter register has been cleared into the product register, set pin 414, or a similarly angularly positioned set pin which has been projected inwardly by arm 329, engages cam edge 424 of lever arm 326 to restore lever 320. This rocks hook 275 out of engagement with pin 274, thereby releasing keys 52 and 53 and terminating the operation of the machine after a single cycle with the carriage in its terminal left-hand position. Since, as described above, tens-transfer in the product register takes place during this first cycle after the carriage is returned to its terminal left-hand position, any tens-transfers occasioned by transfer of a value in the counter register into the product register will be completed. Depression of key 52 thus results in the transfer of a value standing in the counter register into the product register and the accumulation of such value in the product or accumulator register.

13. *Transfer from product register to counter register*

It is also possible, by the present invention, to transfer a value from the product register, or accumulator, 92 into the counter register 106. Such a transfer involves first clearing the counter register, as by operation of clear knob 12 (Fig. 1), for the counter register will not accumulate values since it does not have a tens-transfer effective for this purpose. If a value were transferred into the counter register with a value already standing in this register, an erroneous total would be obtained.

The operation for transferring a value in the accumulator into the counter register is initiated by depression of the "product to counter" (marked "Pro to Ctr") key 54. This key, when depressed, conditions the mechanism to shift the carriage to its terminal left-hand position, if the carriage is displaced from that position; engages the interregister transfer gears; and then clears the product register to transfer any value standing in the product register into the counter register.

The "product to counter" key 54 (Figs. 4 and 27) comprises a top 468 secured on a flat stem 465 mounted for vertical movement by fixed studs 466 and 467 extending through elongated slots in the key stem. The key is strongly biased to its raised, or inoperative, position by springs, not shown, and also by a spring-powered linkage to be described hereafter. At the lower end of its forward edge, the key stem 465 is provided with an upwardly facing latching shoulder 469 (Fig. 4). A link 470 extends along the bottom edge of the frame plate 126 and has, on its forward end, an offset abutment formation 471 engageable with the shoulder 469 to releasably hold the key 54 in latched-down position. The front end of link 470 is supported by a fixed pin 651 mounted on the right-hand control plate 223 and extending through a slot 652 in the link.

At its rear end the link 470 (Figs. 4 and 25) is pivotally connected to the distal end of one arm 472 of a two-armed lever 473 by any suitable means, such as long pin 545. The lever 473 is rockably supported, intermediate its length, on a pivotal mounting 474 carried by the frame plate 126. The distal end of the other arm 475 of lever 473 is connected to a link 476, the upper end of which is connected to a lever 477 (see also Fig. 6) rockably mounted on the side plate 126 near the upper rear corner of the latter. Lever 477 has a tongue 478 extending to the left from the lever, which tongue underlies an extension 479 projecting rearwardly from the override crank, or lever, 480. This crank is L-shaped with an inwardly directed leg 482 that is pivotally mounted adjacent the center of the rear cross plate 72 by any suitable means, such as pin 483. The vertical portion of the lever 480 is held against distortion by a pin-and-slot mounting 481. The crank 480 is rocked downwardly by the right-hand override pawl 144 about the middle of the first cycle after the carriage is moved to its terminal left-hand position. This rocking of the crank 480 rocks levers 477 and 473 (clockwise in Fig. 4) and shifts link 470 forwardly to release the key 54.

The "product to counter" key stem 465 carries, intermediate its length, outwardly projecting pins 485 and 486 (Fig. 4). The pin 485 rides on one arm 487 of a bellcrank lever 488, while the pin 486 rides on the front end portion of a lever arm 489 of a two-armed lever 500 (see Fig. 25) pivoted on screw stud 502 on the control plate 223. Bellcrank lever 488 (Fig. 4) is rigidly mounted at its angle on a stub shaft 490 which is rotatably mounted in frame plate 126 and an outboard bracket, not illustrated. A second arm 491 of lever 488 depends from the shaft 490, and is connected at its lower end to the front end of a link 492. The rear end of link 492 is connected to the upper end of an arm 493 which is supported at its lower end on a pivotal mounting 494 on side frame 126. A second link 495 connects the upper end of arm 493 to the lower end of arm 496 of bellcrank 308 mounted on shaft 190. Thus, depression of key 54 will rock bellcrank 308 and shaft 190 (in a clockwise direction as viewed in Fig. 4) to rock lever 312, and therefore lever 132, to engage the main clutch 116 and close motor switch 115, as described above. The latching of the key 54 in its depressed poition will keep the machine cycling until the key is released by the override slide 480, one cycle after the carriage has been moved to its terminal left-hand position, as previously described. Since depression of key 54 rock shaft 190 in the appropriate direction, the left shift clutch 160, 162 will be engaged and will remain engaged until the key 54 is released and the power clear clutch 184, 185 will be conditioned for engagement when the carriage reaches its terminal left-hand position, as previously explained.

The lever 500 is rocked in a counter-clockwise direction (as viewed in Fig. 25) when key 54 is depressed. The lower end of lever arm 501 of this lever is connected by a link 503 and pin-and-slot connection 504 to the lower end of one arm 505 of a three-armed lever 506 mounted at the juncture of its arms on a fixed pivotal mounting 508 on control plate 223. Lever 506 has a second arm 509 projecting forwardly from the pivotal mounting 508, which second arm is connected at its forward end to one end of a spring 510, the other end of which is connected to a fixed spring hook 511 on a bracket mounted on the frame plate 223. Depression of key 54, acting through lever 500, rocks lever 506 (in a counter-clockwise direction in Fig. 25) against the force exerted by spring 510, while the pin-and-slot connection 504 permits the rocking of lever 506 independently of key 54, as will appear later in connection with the description of the mechanism actuated by key 55.

Lever 506 has a third arm 512 projecting upwardly from the pivotal mounting 508, which third arm carries a perpendicularly projecting pin 514 at its upper end. A link 515 has a slot 516 receiving pin 514, the link being connected at its rear end to the upper end of lever 268. The spring 510 normally urges the link 515 rearwardly and rocks lever 268 to its normal, or gear disconnecting, position in which the notch 267 in the upper end thereof is in alignment with the crank pin 266 when the latter is in its gear disengaging position. However, when lever 500 is rocked by depression of key 54 and, in turn, rocks lever 506 (counter-clockwise as viewed in Fig. 25), this conditions link 515 for forward movement against the force of spring 510, under conditions presently to be described. A spring 517 is tensioned between pin 514 and the link 515 rearwardly of pin 514, and hence resiliently biases link 515 forwardly when lever 506 is rocked by depression of key 54. However, link 515 is latched in its rearward position, by latching means to be described next, unless the carriage is in its extreme left-hand position. Thus, if the carriage is so positioned, the rocking of lever 506 will simultaneously rock lever 268 counter-clockwise, but if the carriage is out of position, the link, and hence the lever 268, will be held against movement until link 515 is released by the carriage reaching its terminal left-hand position, whereupon the link is released and lever 268 will thereupon be rocked to move the crank 265 to the transfer gear-engaging position of the bail 264.

A latching rocker 520 is mounted on a pivotal mounting 521 on control plate 223, and extends forwardly and rearwardly from this mounting. A link 522 connects the forward portion of lever 520 to the forward arm 523 of a bellcrank lever 524. This bellcrank is rockably mounted at its elbow, on a stud 525 projecting from the control plate 223. A spring 526 is tensioned between the other arm 527 of bellcrank 524 and arm 528 of second bellcrank 530 rockably mounted on the same stud 525 and opposed to lever 524. This spring exerts a resilient force to rock lever 524 (in a counter-clockwise direction as viewed in Fig. 25) and pulls downwardly on the link 522. The levers 524 and 530 are a part of the mechanism controlled by the multiplier setting key 55 and their function and operation will be later described in detail. However, it should be noted here that spring 526 resiliently urges latching lever 520 (counter-clockwise in Figs. 25 and 27) to the latching position shown in Fig. 27.

The lever 520 carries, near its forward end, a perpendicularly projecting pin 531 which engages in a notch 532 in the upper edge of link 515, when lever 520 is rocked counter-clockwise by the pull of spring 526 on bellcrank 524 and link 522. Lever 520 thus normally holds the link 515 against movement by spring 517, and actually is operative so long as the carriage is out of its extreme left-hand position. This latch obviously prevents rocking of lever 268 away from the position it occupies when the interregister transfer gears are disengaged until latch lever 520 is rocked to disengaging position by the shifting of the carriage to its extreme left-hand position. The rear end portion of lever 520 is disposed just to the left of the notch 267 in the upper end of lever 268 (Fig. 27). It will be noted that the pin 266, which rocks the interregister transfer gear control bail, has a pointed, or beveled, left-hand end, as indicated at 533 (Figs. 26 and 27). Whenever the carriage is moved to its terminal left-hand position, whether resulting from depression of transfer key 54 or otherwise, the beveled end of pin 266 passes through notch 267 in the upper end of lever 268 and engages the upper edge of the rear end portion of lever 520, rocking this lever (in a clockwise direction as viewed in Fig. 25) against the force of spring 526. This clockwise rocking of lever 520 moves pin 531 out of notch 532 and releases link 515 for limited forward movement by spring 517 if lever 506 has been operated by key 54. Any movement of link 515, with the parts in this condition, rocks lever 268, and hence bail 264, to engage the interregister transfer gears at the beginning of the first machine cycle after the carriage reaches its left-hand position. It will be noted that the key release link 470 is moved during this same cycle to release key 54 but that, because of the construction and operation of the cyclic clutch 116, the full-cycle will be completed even though key 54 is released before the end of the cycle.

In the operation here under consideration, only the accumulator, or product, register will be cleared, for the clearing control levers operated by keys 52 and 53 (the levers 328, 333 and 341 shown in Figs. 17 and 24) have not been rocked in the operation established by depression of key 54. Therefore, the hook portion 357 of lever 353 (Fig. 11) will be held in engagement with the product register clearing knob 100 by spring 344 (Fig. 24). The depression of key 54 rocked shaft 190 (by means of the linkage shown in Fig. 4) and the rocking of the shaft conditioned the power clear clutch 184, 185 (Fig. 5) for operation in the first cycle after the carriage reaches its left-hand position. Thus, in this first cycle after the carriage reaches its left-hand position, the power clear cam 183 (Fig. 6), acting through levers 194 and 202 and slides 200 and 203, moves the product register clearing rack 98 to the right to clear the product register. However, in the latter part of the preceding, or last shifting, cycle, the movement of the carriage into its terminal position caused engagement of the interregister gears, as a result of pin 266 rocking latch lever 520 to release link 515 to the force of tensioned spring 517. In the clearing cycle these gears are effective to reverse rotational motion between the product register dial assemblies and the counter register dial assemblies, so that the value cleared out of the product register will be entered positively, or additively into the counter register.

As has been previously explained and best shown in Fig. 10, lever 268 is latched in gear-engaging position by latch lever 400 and, at the end of the product register clearing phase of the transfer cycle, stud 403 on cam 391 (Figs. 10 and 25) will successively engage the tail portion 404 of latch lever 400 and the tail portion 407 of setting lever 268 and positively return lever 268 to its normal position corresponding to the disengaged condition of the interregister transfer gears. Since pin 266 is in engagement with lever 268 at this time, this will positively disengage the interregister transfer gears at the end of the transfer, or clearing, phase of the first cycle after the carriage has been moved to its terminal left-hand position. Since key 54 is released at approximately the same time as the clearing operation is effected, the parts actuated by depression of this key are all restored to their normal, or full-cycle, positions before the end of the cycle.

14. Multiplier setting

The purpose of the multiplier setting key 55 is to transfer a value from the keyboard 41 of the machine into the counter register, so that, for example, this value may be used as a multiplier by suitable multiplication mechanism, such as that disclosed in my Patent No. 2,872,115 issued February 3, 1959. The multiplier setting mechanism utilizes the conventional division mechanism of the machine described above, to enter a value set up in the keyboard into the product, or accumulator, register, and from the product register into the counter register through the interregister transfer gearing, while leaving any value that was previously standing in the product register unchanged. The setting of a value from the keyboard into the counter register is an entirely automatic operation established by depression of the multiplier setting key 55, and is accomplished in not more than three operating cycles of the machine after the carriage has been returned to its terminal left-hand position.

The key 55 (Figs. 25 and 27) comprises an elongated bar, or key lever, 535 which is pivotally mounted at its rear end on the pivotal mounting 521 which supports the lever 520, and which carries on its upturned front end, a key top 536. A pin 538 projects from one side of the key lever 535, immediately below the key top 536. A key latch lever 539 is rockably mounted at its lower end on the right-hand end of a shaft 540 and is provided, near its upper end, with a shoulder 541 engageable with the pin 538 to releasably hold the key 55 in latched-down position.

A latch-releasing link 542 extends longitudinally of the machine, along the bottom edge of control plate 223, and is connected at its front end to latch-down lever 539 by a pin-and-slot connection 543. A spring 544 connected between latch lever 539 and link 542 urges the latch lever to rock in a direction (clockwise in Fig. 25) to engage its shoulder 541 over the pin 538. At its rear end link 542 is pivotally mounted on the long stud 545 which also connects link 470 to the lower end of arm 472 of lever 473. This link 542 will be moved forwardly to release key 55 during the first machine cycle after the carriage has been moved to its terminal left-hand position in the same manner that link 470 is moved forwardly to release key 54, as described above.

The bottom edge of key lever 535, near the front end thereof, bears on a roller 546 carried at the distal end of an arm 547 rigidly mounted on the right-hand end of shaft 490. This shaft is therefore rocked (clockwise in Figs. 25 and 27) when key 55 is depressed. Rocking of shaft 490, as explained in the preceding section and as shown in Fig. 4, acts through lever arm 491, links 492 and 495 to rock bellcrank 308 and shaft 190. Rocking of lever 308 acts through levers 312 and 132 to engage the main clutch 116 and close the motor switch 115 to cause the machine to cycle. Rocking of shaft 190 engages the carriage left shift clutch 160, 162 and would normally condition the power clear clutch 184, 185 for engagement when the carriage reaches its terminal left-hand position, except for the fact that this action is suppressed by the following mechanism.

An extended projection 550 (Figs. 25 and 27) extends downwardly from the forward portion of the key lever 535. This projection has a pin-and-slot connection at its lower end with the distal end of an arm 551, which is pinned to, or otherwise rigidly mounted on, shaft 540 extending through, and supported in, the frame side plates near the front end of the machine. A spring 548 secured at one end to the pin on arm 550 and at its other end to a bracket on frame plate 223, resiliently urges lever 535 to its raised position. Arm 551 rocks shaft 540 (in a clockwise direction in Fig. 25) when key 55 is depressed, and this shaft rocks an arm 522 (Fig. 16) mounted on the shaft in substantial alignment with the power clear clutch control rod 186. A bellcrank lever 554 (Fig. 16) is rockably mounted at its angle on saft 190 substantially in alignment with clear clutch control rod 186, and has one arm 555 connected at its distal end to the distal end of arm 552 by a link 556. The other arm 557 of lever 554 underlies a pin 558 on the pusher link 193 which transmits the motion from the lever arm 192 to the front end of the control rod 186 to engage the power clear clutch. This bellcrank 554, when rocked, raises the link 193 away from the front end of rod 186 to disable the connection between shaft 190 and control rod 186, and thereby suppersses the power clear operation. Depression of key 55 will thus cause left shifting of the carriage, if the carriage is displaced from its terminal left-hand position, but will not establish a power clearing operation.

A link 560 (Figs. 25 and 27) is connected at one end to the key lever 535 intermedite the length of the key lever and is connected at its other end to the distal end of an arm 561 of the lever 530 rockably mounted on stud 525. Link 560 serves to rock lever 530 (in a counter-clockwise direction in Fig. 25) when the key 55 is depressed. As shown in Figs. 25, 27, 28 and 29, a disk 562 is rotatably mounted on the fixed shaft stud 253 at the outer side of cam 391 by means of a hub 563 which is slidably mounted on the stud, or stub shaft, 253. A pin 567 extends from the inner side of the disk through an aperture in cam 391 to drivingly connect the cam to the disk. The cam 391 has a hub 568 projecting inwardly (to the left in Figs. 28 and 29) from the cam and secured at its end, remote from the cam, to the gear 252, so that the cam is driven by this gear which is enmeshed with driving gear 214. A pin 569 extends through an aperture in hub 568 and into an annular groove in shaft 253 to hold the cam against movement longitudinally of the stud while providing free rotation of the cam on the stud. The outwardly extending hub 563 of disk 562 is provided with an annular groove 564 and a flange, as shown. A compression spring 565 surrounds an outwardly projecting boss of the hub 563 between the outer end of the hub and a head 566 on the outer end of stud 253, and resiliently urges the disk 562 toward the disk cam 391.

The lever arm 527 (see Fig. 25) has a terminal formation 570 normally engaged in the groove 564 of the disk hub 563, when the carriage is displaced from its leftmost position. However, upon movement of the carriage into its leftmost position, pin 266 cams lever 520 clockwise to remove terminal formation 570 from the groove. Arm 528 of lever 530 has a similar terminal formation 571, also normally engaged in the groove 564, so that when either or both of the terminal formations 570 and 571 are engaged in the groove 564, the disk 562 is held in a right-hand, inoperative position (Fig. 28) against the force of spring 565. When lever 530 is rocked through link 560, upon depression of key 55, as described above, the terminal formation 571 of lever arm 528 is withdrawn from engagement in the disk hub groove 564, but the terminal formation 570 of lever arm 527 is still engaged in the hub groove and holds the disk in inoperative position when the carriage is one or more ordinal steps to the right of the leftmost position thereof.

As the carriage is moved to its terminal left-hand position, the crank pin 266 cams the lever 520 clockwise to remove the pin 531 from the notch 532 in the upper edge of link 515. As described above, the link 522 rocks the lever 524 clockwise to withdraw the terminal formation 570 of lever arm 527 from the disk hub groove 564 (as seen in Fig. 25). This frees the disk for movement by spring 565 toward the cam 391 to the operative position of the disk wherein a pin 574 on disk 562 is moved into the plane of a lever 576 pivotally mounted intermediate its length on stud 525. Near the end of the machine cycle immediately following the cycle in which the carriage was moved to its terminal left-hand position, pin 574 engages a cam edge 575 on the upper end of lever 576 (see Figs. 25 and 27) to rock this lever (counter-clockwise in these figures). It will be noted in the figures that lever 576 carries at its upper end a perpendicularly projecting pin 585, which rides on the outer edge of cam 391 to assure engagement of the stud 574 on disk 562 with the cam edge 575.

A link 578 is connected at one end to the lower end of lever 576 and extends upwardly and forwardly from this connection. At its opposite end, link 578 is provided with a longitudinally extending slot 579 receiving the pin 504, and with an upstanding abutment formation 580 disposed immediately in front of a pin 581 projecting from the outer side of an extension 582 at the upper end of division trigger arm 222. With this arrangement, when lever 576 is rocked counter-clockwise, as described above, it pulls link 578 to the right (Fig. 25) and this link, acting through pin 504, rocks three-armed lever 506 counter-clockwise. The rocking of lever 506, through spring 517 and link 515, rocks lever 268 and bail 264 to engage the interregister transfer gears 258 and 260. At the same time, abutment formation 580 on link 578 rocks trigger arm 222 clockwise (as viewed in Fig. 25) to release the division actuating lever 206 to be rocked counter-clockwise by the spring 208. The rocking of lever 206, by its engagement with pin 224 (Figs. 7 and 8) at the front end of division control lever 215, rocks the control lever to engage the notch 226 therein with the pin 228, thereby moving the add-subtract gate 136 (Fig. 2) to its subtract position, as has been previously described. During this same cycle, i.e., the first cycle following the shifting movement of the carriage into its leftmost position, stud 213 (Fig. 7) on gear 214 engages the camming surface 212 of the actuating lever 206 and restores this lever to the position in which it is latched by the trigger arm 222. During an attempted left shift of the carriage in this first cycle, override pawl 144 and associated mechanism moves link 542 forwardly (to the left in Fig. 25) to release the key 55 as described above.

Referring to Figs. 9 and 26, latch lever 232 is normally maintained in latching position by spring 234 (clockwise from the position shown in Fig. 9), so that when control lever 215 is rocked clockwise (Fig. 8) the tooth on latch 232 engages the flattened pin 235 to maintain the lever 215 in operative position. As the carriage is shifted into its leftmost position, the tip 614 of live pawl 236 engages the side of the upper end 615 of the lever 232, whereupon the latch lever rocks the pawl 236 clockwise (Fig. 26) against the urgency of spring 237. During the overdraft restore cycle of the division phase of the operation, when the control lever 215 operates in a well-known manner to condition the machine for an additive registration in the product register, latch lever 232 is rocked to the position shown in Fig. 9. Spring 237 is then effective to restore live pawl 236 to its normal position (Fig. 26), and the end of the tip 614 is moved in behind the upper arm 615 of lever 232. When so positioned, latch lever 232 is blocked against return to its subtract position (clockwise movement in Fig. 9), so that when the division control lever 215 (Fig. 8) is shifted forwardly to again position the plus-minus gate 136 for subtraction, pin 235 is moved out of the tooth of lever 232, thereby terminating the operation. If the carriage is in its leftmost position when the key 55 is depressed, the key 55 is released upon the attempted left shift of the carriage, and, in the latter part of the cycle, pin 574 (Figs. 25 and 29) engages arm 576, to pull link 578 rearwardly and release trigger arm 222 to initiate the division phase of the operation.

Conventional means serve to maintain the main clutch 116 engaged and the motor contacts closed for the duration of the multiplier setup operation following the release of the key 55. When control lever 215 is rocked clockwise (Fig. 8), upon operation of trigger 222, to condition the machine for the division phase of the operation, link 638 rocks bellcrank 635 (counter-clockwise in this figure) to move the slide 642 to the rear (left) to maintain the clutch engaged. With the release of the key 55, the springs supported between the respective arms and pusher links 192, 193 (Fig. 16) and 181 and 199 (Fig. 15) serve to rock shaft 190 (counterclockwise in these figures and in Fig. 4) to disable the control for the left shift mechanism.

It will be recalled that arm 524 is rocked to disengage hub 563 upon shifting of the carriage into its terminal left-hand position, and is held in the rocked position as long as the carriage is in its terminal position. Depression of key 55, by translating link 560 downwardly and rocking bellcrank 530 (counter-clockwise in Fig. 25) has caused it to also release hub 563. When the hub is released by both arms, the disk 562 is permitted to shift to the left to bring pin 574 into the plane of arm 576. In the first cycle following the release of the hub by both arms (in the first cycle if the carriage is in its extreme left-hand position, or in the first cycle following its shift into that position), the override pawl, operating through link 542, releases key 55. Release of key 55, by lifting link 560, with the aid of spring 526, rocks lever 528 (clockwise in Fig. 25) to move its terminal formation 571 against the periphery of the hub 563. At the beginning of the second machine cycle, i.e., the cycle following the one in which the disk 562 was released by the movement of both arms 524 and 530, the left-hand end of disk carried pin 567 strikes a cam face 586 (Figs. 7, 28 and 29) carried at the distal end of a forwardly directed arm 587 of a bellcrank lever 588 mounted at its angle on a fixed pivotal mounting 589 on frame plate 223. A spring 591 is connected to a second arm 590 of bellcrank 588, and holds the arm 587 against the hub of gear 252. The cam 586 therefore forces the disk 562 to the right, back to its inoperative position shown in Fig. 28, in which position it is latched by the engagement of the terminal formation 571 of bellcrank 530 in the annular groove 564. Lever 524 will not be rocked to re-engage its terminal formation 570 in the disk hub groove 564 until the carriage is moved away from its left-hand terminal position, but acts to restrain the disk 562 from moving to operative position at all times that the carriage is displaced from its left-hand position. Bellcrank 530 restrains the disk from moving to operative position to trip off division except when key 55 is depressed, and thus insures that disk 562 will be ineffective during usual operations, such as addition, subtraction, multiplication and conventional division, in which the carriage may be moved to its terminal left-hand position.

With a value set in the keyboard and the multiplier setup key 55 depressed, the carriage is first returned to its terminal left-hand position, if displaced from that position, and at the beginning of the first cycle after the carriage is fully returned, the key 55 is released. Near the end of this first cycle, the interregister transfer gears are engaged and the division mechanism is tripped off to condition the machine for subtraction. During the first part of the second cycle, the keyboard value is entered subtractively into the product register and additively into the quotient register. Also, during this second cycle, the division actuating lever 207 is restored, and the disk 562 is returned to its inoperative position. Even though the division actuating lever 207 is restored, control lever 215 will remain in operative position due to the latching engagement of lever 232 with the pin 235. At about the midpoint of this second cycle, immediately following the digitation phase of the cycle, after the keyboard value has been entered subtractively in the product register and additively in the counter register, the interregister transfer gears are disengaged by engagement of pin 403 on cam 391 with the tail portions 404 and 407 of the levers 400 and 268.

It is now necessary to restore the product register to its original condition by additively restoring the keyboard value subtracted therefrom, and this is done by creating a false overdraft to program the division mechanism. During an operation initiated by a depression of the keys 47, 48 a true overdraft effects operation of the division programming mechanism in a conventional manner. As shown in Figs. 6, 10 and 25, to create a false overdraft, a shaft 594 extends transversely of the machine and through the right and left-hand side frame plates 126 and 257 near the lower rear corners of these frame plates, and carries three radially projecting lever arms 595 (Fig. 10), 596 and 597 (Fig. 6). The lever arm 597 is positioned along the shaft 594 immediately to the left of a tail 598 projecting rearwardly from the right-hand end of the overdraft responsive flag 244 (see Figs. 2 and 5). At its distal end this arm carries a perpendicularly projecting pin 599 which overlies the arm 598. Any counter-clockwise rocking of shaft 594 (Fig. 2) causes arm 597 to depress arm 598 to rock the flag tongue 245 into the path of the eccentric pin 246 to establish a division program by shifting the shaft 220 to the right (Fig. 5) as has been previously described.

The lever arm 596 (Figs. 2, 4 and 6) is connected by a pin-and-slot connection 600, to the lower end of a link 601, the upper end of which is pivotally connected to the override lever 480. This connection is effective to restore the shaft 594 and arm 597 to their original positions and to enable the removal of the flag tongue 245 from the path of the eccentric pin 246 by a spring (not shown) normally biasing the flag 244 to its inoperative position, during the idle left shift cycle under the control of the division programming mechanism. As the carriage is already in its terminal left-hand position, the usual ordinal shift of the carriage to the left after correction of the overdraft in the division programming operation, cannot take place.

The lever 595 (Figs. 10 and 25) is secured to the right-hand end of shaft 594 and is strongly biased to an operative position to establish the simulated overdraft (counter-clockwise in these figures) by a spring 605 tensioned between the arm and a stud on the control plate. However, such rocking of the arm and shaft 594 is blocked by two different blocking mechanisms. Lever 594 carries perpendicularly projecting pin 602 which normally bears against the rear end of a blocking lever 603 rockably mounted on the right-hand end of the add-subtract gate rock shaft 137. The blocking lever 603 is provided, at its front end, with a pin which engages the lower edge of the latch lever 400. A spring 604 connected between this pin and the lever 400, resiliently maintains lever 603 in the position in which this pin abuts against the bottom edge of lever 400, regardless of the position of the latter. When lever 268 is rocked to engage the interregister transfer gears in the latter part of the first cycle, and lever 400 is rocked to latch lever 268 in this position, the rear end of lever 603 is raised above the pin 602, as shown in Fig. 10. This lifting of the rear end of lever 603 removes the first of the blocks which prevent rocking of arm 595 and shaft 594, under the force of spring 605, to establish a false, or simulated, overdraft.

The lever 595 is formed with a long, forwardly projecting arm 608 which normally bears, at its forward end, against a pin 609 projecting perpendicularly from an arm 610 secured at its proximal end on the right-hand end of shaft 240. As described above in connection with Fig. 8 shaft 240 is rocked (counter-clockwise in Fig. 8, or clockwise in Fig. 10) by arm 241 bearing on stud 242 projecting from the division control lever 215, when division is initiated. Thus, when division is initiated, pin 609 is moved upwardly out of the path of arm 608, thereby removing the second block to the rocking of lever 595. The initiation of division, after latch 400 becomes effective to lock control lever 268 in interregister gear-engaging position, frees lever 595 to be rocked by its spring 605 to rock shaft 594 and establish a false, or simulated, overdraft. Stop 602, 603 prevents the establishment of a false overdraft during a normal division operation of the machine; and stop 608, 609 prevents the setting up of a false overdraft in any operation not involving the division programming mechanism, specifically an operation initiated by keys 52, 53 or 55.

The setting up of the simulated overdraft in the first cycle, i.e., as the keyboard value is subtractively entered into the product register and simultaneously additively entered into the counter register, sets the flag 244 to shift the shaft 220 to the right and move the gear 250 into mesh with the gear 251. Immediately following the translation of shaft 220 to the right, gear 251 drives gear 250 through an angle of 120° and cam 221 (Fig. 8) shifts interponent 215 forwardly to condition the machine for addition. In this second, or additive, cycle, the interregister transfer gears are disengaged while the keyboard value is added back into the product register, thereby restoring this register to its original condition with the keyboard value now in the counter register.

In all of the operations herein mentioned, it is necessary that the conventional counter actuator 625 be disabled during the transfer operation. Obviously, actuation of the counter while the registers are interconnected would either jam the machine or effect an error of "1" in the result. In the first three operations mentioned, viz., the "counter to product" transfer, the "product to counter" transfer, and the "accumulate" operation, the transfer took place while the digitation control, or "plus-minus," gate 136 was in a neutral position. It is conventional, in the machine of the patents above-mentioned, to block out the counter by means of a counter blockout link (not shown) operated by the gate 136 when the gate is in its neutral, or carriage shift, position. In addition, I prefer to add a selectively operated blockout, such as shown in Fig. 4. It will be noted that the rear end of manually settable lever 626 is engageable at its rear end with the forwardly directed tail 632 of the rocking arm 630. The rocker 630 is the operating interponent of the counter actuator 625, so that if this arm is held against rocking, the counter actuator is disabled, as is described particularly in the patent to Friden, No. 2,366,345.

In connection with the operation last described, viz., the setting of a keyboard factor into the counter by the depression of the "set multiplier" key 55, the gate 136 is operated in both cycles, so the normal counter blockout is ineffective. To avoid the necessity of using the manually operated blocking lever 626, an additional blockout, such as that shown in Fig. 4, is provided. This automatic blocking mechanism includes an ear, or bend, 628 extending to the right from the rear end of rocker 630. An arm 712 (Fig. 10) is pivotally mounted at its lower end on fixed pivot stud 700 mounted on control plate 223 below ear 628. The upper end of arm 712 is movable into and out of position to engage the bottom edge of lip 628. When the upper end of this arm is under the lip 628 the counter actuator is disabled. A link 701 is pivotally connected at its rear end to arm 712 and extends forwardly from this arm to a location adjacent the rear edge of an ear 702 projecting to the right from the upper edge of clutch control link 128 intermediate the length of this link. An extension 703 depends from link 701 near the front end of this link, which extension carries at its lower end, a pin 704 underlying the bottom edge of bar 535 of key 55. Thus, the front end of link 701 will be moved downwardly behind the rear edge of ear 702 when key 55 is depressed. A spring 705, connected between pin 704 and a pin 704' projecting from frame plate 223, resiliently urges the front end of link 701 upwardly when key 55 is released. A tab, or projection, 706 at the lower edge of the front end of link 701 engages under ear 702 and holds the front end of the link in engagement with the ear as long as link 128 is displaced rearwardly from its full-cycle, or clutch-disengaging, position. A spring 707 connected between link 701 and a fixed connection, resiliently urges arm 712 forwardly and out of engagement with lip 628.

When key 55 is depressed, the front end of link 701 is moved downwardly in opposition to the rear edge of ear 702 and, when link 128 is moved rearwardly to engage the clutch 116, ear 702 shifts link 701 rearwardly and engages over the tab 706. Rearward movement of link 701 rocks arm 712 rearwardly to dispose the upper end of this arm under lip 628 and block the counter actuator by holding rocker 630 against movement. Since tab 706 is caught under ear 702 and the ear is not moved forwardly to release this tab until clutch 116 is disengaged at the end of the multiplier setting operation, the counter actuator will be blocked during this entire operation even though key 55 is released during the first cycle.

At the end of the operation when link 128 is released and moved forwardly by spring 708 (Fig. 4), ear 702 releases the front end of link 701. The link is then raised by spring 705, freeing spring 707 to move the upper end of arm 712 forwardly out of engagement with lip 623 and thus terminating the blocking of the counter actuator.

It will be remembered that when the carriage is displaced from its terminal left-hand position at the time the multiplier setup key 55 is depressed, the carriage will be shifted to the left before division is automatically tripped off. The latch hook 232 (Fig. 9) will be held by spring 234 in position to engage the flattened pin 235 when the division control lever 215 is actuated to move the add-subtract gate to its subtract position, and the nose portion 614 of latch dog 236 will engage the right-hand side of the tail portion 615 of hook 232 with the gate in subtract position and will be urged against this tail portion by spring 237. The nose 614 of the latch dog will remain in its inoperative position to the right of the tail portion 615 of the hook during the subtract cycle, but when the add-subtract gate is moved to add position at the start of the next cycle, the nose portion 614 of the live point 236 will be moved behind the tail portion 615 of the hook, or latch 232 by spring 234 and will then restrain the latch dog against movement when the add-subtract gate is again moved toward its subtract position after the addition cycle. This causes the latch 232 to release the division control lever 215 and terminate operation of the machine.

These same conditions apply if the key 55 is depressed while the carriage is already in its terminal left-hand position, as when the depression of the key 55 follows a multiplication or substraction operation or an addition operation that has not been directly preceded by a division or multiplier setting operation, and, in these cases, the above-described operation would apply.

If, when key 55 is activated, the carriage is already in its terminal left-hand position and the live point 236 is engaged behind the upper arm 615 of the latch lever 232, holding the lower hook end of the latch lever in a rearwardly displaced position, as would be the case if the preceding operation had been a division operation, the hook of the latch lever could not engage the pin 235 to hold the division control arm 215 in operative position. Under these circumstances, the key would be restored and the operation of the machine terminated by the end of the first cycle of operation. The value standing in the product register would be cleared subtractively from this register and transferred into the counter register, since the actuating arm 222 will hold the division control lever 215 in operative position for a sufficient length of time for this operation, but the value would not be additively restored to the product, or accumulator, register. In order to assure the restoration of the product register to its original condition, even under the above-described conditions, an ear 622 (Fig. 8) is provided on the add-subtract gate control slide 230 to extend upwardly from the upper edge of this slide near the rear end thereof. Associated therewith is a pin 621 (Fig. 26) provided on the pivoted arm 238 to depend from this arm into the path of the ear 622. With these provisions, if the latch lever 232 is being held by live point 236 with the lower, or hook, end of the latch lever displaced rearwardly at the time the key 55 is depressed, as the slide 230 is moved forwardly by the seating of pin 228 in the notch 226 in the rear end of lever 215, as explained above in connection with Fig. 8, ear 622 will engage pin 621 and rock lever 238 forwardly, or clockwise as seen in Fig. 26. When lever 238 is thus rocked forwardly, a lateral extension 616 on the left-hand, or distal, end of this lever engages a pin depending from the distal end of arm 617 of live point 236 and rocks the live point (clockwise as viewed in Fig. 26) to displace the live point arm 614 to the right-hand side of the upwardly extending arm 615 of the latch lever 232. This frees the latch lever for movement by spring 234 to engage the hook on the lower end of the latch lever with the flattened pin 235 on the control lever 215 to hold the control lever in position to maintain the machine in operation. When, after the first, or subtraction, cycle of the program has been completed, the control lever 215 moves the add-subtract gate control slide 230 rearwardly to condition the actuating mechanism for the addition cycle of the program, the ear 622 is moved away from the pin 621 and the upwardly projecting arm 615 is displaced forwardly of the front end of the forwardly projecting arm 614 of the live tip 236. This frees the live tip for movement by spring 237 to return the live tip 614 to blocking position behind the upper portion of latch lever arm 615. The latch lever will now be held in position with its lower, or hook, end rearwardly displaced so that, when control lever 215 moves slide 230 forwardly for the third, or left-hand shift, cycle of normal division, the pin 235 will be pulled off of the hook of latch lever 232, freeing spring 690 (Fig. 8) to rock the bellcrank lever 635 to terminate operation of the machine.

It is to be understood that suitable interlocks will be provided between the keys 52 and 53 and the keys 54 and 55 and between these control keys and the conventional control keys of the machine, but, since such interlocks are generally considered non-inventive, they have not been illustrated or described.

I claim:
1. In a power-operated calculating machine, a shiftable register carriage, left shift mechanism for said carriage, a product register and a counter register mounted in said carriage and ordinally aligned transfer gearing mounted in said carriage and including ordinal units extending between corresponding orders of said registers, power-operated means effective to subtract a value from at least one of said registers, manually conditioned control mechanism effective to establish cyclic operation of the machine and enable said left shift mechanism to shift said carriage to its terminal left-hand position, means rendered effective upon the carriage reaching its terminal left-hand position to enable said power-operated means, transfer control means rendered effective upon the carriage reaching its terminal left-hand position to enable said transfer gearing to additively enter into the other of said registers a value subtracted from said one register, and means effective to terminate operation of the machine when the value has been transferred.

2. In a power-operated calculating machine, a shiftable register carraige, left-hand shift mechanism for said carriage, a product register and a counter register mounted in said carriage in ordinal alignment, digitation mechanism and tens-transfer means for said product register, cyclically operating actuating means for said counter register, power-operated clearing means for said registers, interregister transfer means mounted in said carriage and including ordinal units effective to interconnect corresponding orders of said product register and said counter register, power-driven control mechanism effective to enable said left shift mechanism to move said carriage to its terminal left-hand position if displaced therefrom, disable said counter register actuating means, enable said interregister transfer means and enable the counter register clearing means to clear a value from said counter register into said product register for addition with tens-transfer to any value already in said product register during the first machine operating cycle after said carriage reaches its terminal left-hand position, disabling said interregister transfer means during the tens-transfer interval of the coincident operating cycle, re-enable said interregister transfer means and enable the product register clearing means to clear the value in the product register into the counter register during the second machine operating cycle after said carriage has been shifted to its terminal left-hand position for accumulation of values in said counter register, and disable said interregister transfer means and terminate machine operation at the end of said second operating cycle after said carriage has been shifted to its terminal left-hand position, and manually operated means effective to establish operation of the machine and condition said power-driven control means for operation.

3. In a power-operated calculating machine, a shiftable register carriage, left-hand shift mechanism for said carriage, a product register and a counter register mounted in said carriage in ordinal alignment, digitation means for said product register, actuating means for said counter register, power-operated clearing means for said counter register, interregister transfer means mounted in said carriage and including ordinal units effective to reversely interconnect corresponding orders of said registers, power-driven control mechanism effective to enable said left shift mechanism to move said carriage to its terminal left-hand position if displaced therefrom, disable said counter register actuating means, enable said interregister transfer means, enable said clearing means to clear a value standing in said counter register into said product register during the first machine operating cycle after said carriage is moved to its terminal left-hand position and terminate machine operation at the end of the same cycle, and manually operated means effective to establish operation of the machine and condition said power-operated control means for operation.

4. In a power-operated calculating machine, a shiftable register carriage, left-hand shift mechanism for said carriage, a product register and a counter register mounted in said carriage in ordinal alignment, digitation mechanism and tens-transfer mechanism for said product register, actuating means for said counter register, power-operated clearing means for said registers, interregister transfer means mounted in said carriage and including ordinal units effective to reversely interconnect corresponding orders of said counter register and said product register, power-driven control mechanism effective to enable said left shift mechanism to move said carriage to its terminal left-hand position, disable said counter register actuating means, enable said interregister transfer means and enable the counter register clearing means to clear a value from said counter register into said product register for addition with tens-transfer to any value standing in said product register and disable said interregister transfer means before the tens-transfer operation during the first machine operating cycle after said carriage is moved to its terminal left-hand position and effective to re-enable said interregister transfer means and enable the product register clearing means to clear the value in the product register into the counter register during the second machine operating cycle after said carriage is moved to its terminal left-hand position, and disable said interregister transfer means and terminate machine operation at the end of said second cycle, a first control key effective when operated to establish machine operation and condition said power-driven control means for operation, a second control key operable with said first control key, and mechanism conditioned by operation of said second control key to terminate machine operation at the end of said first cycle of machine operation after said carriage has been moved to its terminal left-hand position and before the value is cleared from said product register into said counter register.

5. In a power-operated calculating machine, a shiftable register carriage, left-hand shift mechanism for said carriage, a product register and a counter register mounted in said carriage in ordinal alignment, power-operated clearing means for said registers, interregister transfer means mounted in said carriage and including ordinal units extending between corresponding orders of said registers and effective to reversely interconnect said product register and said counter register, power-driven control means effective to enable said left shift mechanism to move said carriage to its terminal left-hand position and effective in the first machine operating cycle after said carriage is returned to its terminal left-hand position to enable said interregister transfer means, enable the clearing means for said product register to subtractively clear the value from said product register and add the same value into said counter register through said interregister transfer means and disable said interregister transfer means and terminate machine operation at the end of said first cycle, and a control key effective when operated to establish operation of the machine and condition said power-driven control means for operation.

6. In a power-operated calculating machine, a shiftable register carriage, left-hand shift mechanism for said carriage, a product register and a counter register mounted in ordinal alignment in said carriage, power-operated clearing means for said registers, a selection mechanism, digitation mechanism effective to enter a value from said selection mechanism either additively or subtractively into said product register, interregister transfer means mounted in said carriage and including ordinal units effective to reversely interconnect corresponding orders of said registers, power-operated control means effective to maintain said power clearing means disabled and to enable said left shift mechanism to move said carriage to its terminal left-hand position, effective during the first machine operating cycle after said carriage is moved to its terminal left-hand position to enable said interregister transfer means, enable said digitation mechanism to enter a value from said selection mechanism subtractively into said product register and additively through said interregister transfer means into said counter register and disable said interregister transfer means, and effective during the second machine operating cycle after said carriage has been moved to its terminal left-hand position to additively enter the same value from said selection mechanism into said product register with said interregister transfer means disabled and terminate machine operation at the end of said second cycle, and a control key effective when operated to establish operation of the machine and condition said power-operated control means for operation.

7. In a power-operated calculating machine, a register frame, a first and a second register carried by said frame and including ordinally arranged register units each comprising a shaft journalled in said frame, a dial on said shaft and a drive gear on said shaft spaced from the corresponding dial, transfer means extending between corresponding orders of said registers and comprising a shaft journalled in said frame for longitudinal movement, a transfer gear on each of the two register shafts in the same order, and gears on said transfer shaft engaging the corresponding transfer gears on said register shafts with at least one of the gears on said transfer shaft movable into and out of engagement with the corresponding gear on the coordinal register shaft by longitudinal movement of the transfer shaft, control means engaging said transfer shafts for imparting longitudinal movements thereto to enable and disable said transfer means, register driving means effective to subtract a value from one of said registers and enter the same value additively into the other of said registers when said transfer means is enabled, actuating means effective to establish operating cycles of the machine and operated in timed relationship to the operation of the machine to enable said register driving means for a predetermined time interval and to operate said control means to enable said transfer means while said register driving means is enabled, and disable said transfer means when said register driving means is disabled, and manually operable means effective to condition said actuating means for operation.

8. In a power-operated calculating machine having a shiftable register carriage, left shift mechanism for said carriage, an ordinally arranged product register and an ordinally arranged counter register mounted in said carriage, and ordinally aligned transfer gearing mounted in said carriage and including ordinal units extending between corresponding orders of said registers, the combination which comprises a power-operated means effective to clear a value from at least one of said registers, manually conditioned control mechanism effective to establish cyclic operation of the machine and enable said left shift mechanism to shift said carriage to a predetermined left-hand ordinal position, means rendered effective upon the carriage reaching its predetermined ordinal position to enable said power-operated means, transfer control means rendered effective upon the carriage reaching its predetermined ordinal position to enable said transfer gearing to additively enter into the other of said registers a value cleared from said one register, and means effective to disable operation of the transfer mechanism when the value cleared from said one register has been entered into said other register.

9. In a cyclically operated calculating machine having a register frame, a first and a second register carried by said frame and including ordinally arranged register units each including ordinally arranged shafts journalled in said frame, a dial and a drive gear on said shaft, an actuating means operated in a first phase of a machine cycle and a tens-transfer means operating in a second phase of such cycle for one of said registers, and a register clearing means effective to clear a value from either one of said registers during the first phase of a machine cycle, the combination which comprises a transfer means extending between corresponding orders of said registers and including ordinally arranged shafts journalled in said frame for longitudinal movement, a transfer gear on each of the two register shafts in the same order, and gears on said transfer shaft engaging the corresponding transfer gears on said register shafts with at least one of the gears on said transfer shaft movable into and out of engagement with the corresponding gear on the coordinal register shaft by longitudinal movement of the transfer shaft, control means engaging said transfer shafts for imparting longitudinal movements thereto to enable and disable said transfer means and thereby enter the value cleared from either one of said registers additively into the other of said registers when said transfer means is enabled, drive means effective to establish operating cycles of the machine and operated in timed relationship to the operation of the machine to enable said register clearing means and to operate said control means to enable said transfer means during the first phase of a machine cycle and disable said transfer means during the second phase of said cycle, and manually operable means effective to condition said control means for operation and operate said drive means.

10. In a cyclically operated calculating machine having a shiftable register carriage, left-hand shift mechanism for said carriage, a product register and a counter register mounted in ordinal alignment in said carriage, a selection mechanism, digitation mechanism effective to enter a value from said selection mechanism either additively or subtractively into said product register in a first phase of a machine cycle, a tens-transfer means for said product register operative in a second phase of a machine cycle, clearing means for said registers operative in the said first phase of a machine cycle, and a division mechanism operative to control operation of said machine to continuously subtract a divisor value standing in said selection mechanism from a dividend value standing in said product register to an overdraft, then add the divisor value to the dividend value to correct the overdraft and then operate the shift mechanism to shift the relative ordinal position of said carriage with respect to said selection mechanism, an interregister transfer means mounted in said carriage and comprising ordinal units effective to reversely interconnect corresponding orders of said registers; control means effective during the first machine operating cycle to enable said interregister transfer means and simultaneously initiate operation of said division mechanism and thereby enable said digitation mechanism to enter a value from said selection mechanism subtractively into said product register and additively through said interregister transfer means into said counter register during the first phase of the first machine operating cycle and to disable said interregister transfer means and simulate an overdraft during the second phase of said first machine operating cycle, and thereby operate said division mechanism to operate the machine to additively enter the same value from said selection mechanism into said product register during the second machine operating cycle with said interregister transfer means disabled, and finally to terminate machine operation after the end of said second cycle; and a control key effective when operated to establish operation of the machine and condition said control mechanism for operation.

11. In a cyclically operated calculating machine having a register carriage, a product register and a counter register mounted in ordinal alignment in said carriage, a selection mechanism, digitation mechanism effective to enter a value from said selection mechanism either additively or subtractively into said product register in a first phase of a machine cycle, a tens-transfer means for said product register operative in a second phase of a machine cycle, a division mechanism including means for continuously subtracting a value standing in the selection mechanism from a value registered in said product register and an overdraft sensing device and means operated by said device to correct the overdraft, an interregister transfer means mounted in said carriage and including ordinal units effective to reversely interconnect corresponding orders of said registers and a setting means operative to enable and disable said interregister transfer means, a control means for controlling operation of said setting means comprising means effective during the first phase of a first machine operating cycle to operate said setting means to enable said interregister transfer means and simultaneously initiate operation of said division mechanism and thereby enable said digitation mechanism to enter a value from said selection mechanism subtractively into said product register and additively through said interregister transfer means into said counter register and effective during the second phase of such first machine operating cycle to operate said setting means to disable said interregister transfer means and simultaneously operate said overdraft sensing device to simulate an overdraft and thereby operate the division mechanism to additively enter the same value from said selection mechanism into said product register with said interregister transfer means disabled, and to finally terminate machine operation at the end of said second cycle; and a control key effective when operated to establish operation of the machine and condition said control mechanism for operation.

12. In a cyclically operable calculating machine having a selection mechanism, a product register, reversible actuating mechanism effective to enter a value set in said selection mechanism into said product register additively or subtractively in a first phase of an operating cycle, a tens-transfer mechanism for said product register in a second phase of an operating cycle, a counter register, a counter actuator for cyclically operating said counter to count the cycles of machine operation, means for disabling operation of said counter actuator, transfer means effective to reversely interconnect corresponding orders of said registers for additively entering into said counter register a value subtracted out of said product register, and control means effective to engage said transfer means and operate said actuating means subtractively to subtract a value in said selection mechanism out of said product register while entering the same value additively into said counter register in the first phase of a first machine cycle and to then disable said transfer means before the second phase of such first cycle, and then operate said actuating means additively to enter the same value additively into said product register in a second machine cycle and thereby restore the product register to its original condition.

13. In a cyclically operated calculating machine having a register carriage, a product register and a counter register mounted in said carriage in ordinal alignment, digitation mechanism and tens-transfer means for said product register operative respectively in a digitation phase and a tens-transfer interval of a machine cycle, cyclically operating actuating means for said counter register, and clearing means for said registers, the combination which comprises an interregister transfer means extending between corresponding orders of said registers including ordinally arranged shafts journalled in said carriage for rotational and longitudinal movement, a transfer gear on each of the two coordinal register shafts, and gears on said transfer shafts engaging the corresponding transfer gears on said coordinal register shafts with at least one of the gears on said transfer shaft movable into and out of engagement with the corresponding gear on the coordinal register shaft by longitudinal movement of the transfer shaft; setting means engaging said transfer shafts for imparting longitudinal movement thereto to enable and disable said transfer means; control mechanism effective to disable said counter register actuating means, operate said setting means to enable said interregister transfer means and enable the counter register clearing means to clear a value from said counter register into said product register for addition with tens-transfer to any value already in said product register during the digitation phase of a first machine operating cycle, and then operate said setting means to disable said interregister transfer means during the tens-transfer interval of the first machine operating cycle, operate said setting means to re-enable said interregister transfer means and enable the product register clearing means to clear the value in the product register into the counter register during the digitation phase of the second machine operating cycle for accumulation of values in said counter register, and finally disable said interregister transfer means and terminate machine operation at the end of said second operating cycle; and manually operated means effective to establish operation of the machine and condition said control means for operation.

14. In a cyclically operated calculating machine having a register carriage, a product register and a counter register mounted in said carriage in ordinal alignment, digitation means for said product register operative in a first phase of a machine cycle, a tens-transfer means for said product register operative in a second phase of a machine cycle, a cyclically operated actuating means for said counter register, and clearing means for said counter register operative in the first phase of a machine cycle, an interrregister transfer means mounted in said carriage comprising ordinal units effective to reversely interconnect corresponding orders of said registers and including ordinally arranged shafts journalled in said carriage for rotational and longitudinal movement, a transfer gear on each of the two coordinal register shafts associated with each transfer shaft, and gears on said transfer shafts engaging the corresponding transfer gears on said coordinal register shafts, with at least one of the gears on the transfer shaft movable into and out of engagement with the corresponding gear on the coordinal register shaft by longitudinal movement of the transfer shaft; setting means engaging said transfer shafts for imparting longitudinal movement thereto to enable and disable said transfer means; control mechanism effective to disable said counter register actuating means, operate said setting means to enable said interregister transfer means, and enable said clearing means to clear a value standing in said counter register into said product register during the first phase of a machine operating cycle and then operate said setting means to disable said interregister transfer means during the second phase of such first machine operating cycle, means to terminate machine operation at the end of the same cycle, and manually operated means effective to establish operation of the machine and condition said control means for operation.

15. In a cyclically operated calculating machine having a register carriage, a product register and a counter register mounted in said carriage in ordinal alignment, digitation means for said product register operative in a first phase of a machine cycle, a tens-transfer means for said product register operative in a second phase of a machine cycle, and a cyclically operated actuating means for said counter register, and clearing means for said registers operative in the first phase of a machine cycle, an interregister transfer means mounted in said carriage comprising ordinal units extending between corresponding orders of said registers and effective to reversely interconnect said product register and said counter register and including ordinally arranged shafts journalled in said carriage for rotational and longitudinal movement, a transfer gear on each of the two coordinal register shafts associated with each transfer shaft, and gears on said transfer shafts engaging the corresponding transfer gears on said coordinal register shafts, with at least one of the gears on the transfer shaft movable into and out of engagement with the corresponding gear on the coordinal register shaft by longitudinal movement of the transfer shaft; setting means engaging said transfer shafts for imparting longitudinal movement thereto to enable and disable said transfer means; control means effective to disable said counter register actuating means and operate said setting means to enable said interregister transfer means and enable the clearing means for said product register to clear a value from said product register and add the same value into said counter register in the first phase of a machine operating cycle and then operate said setting means to disable said interregister transfer means during the second phase of such first machine operating cycle, means to terminate machine operation at the end of said first cycle, and a control key effective when operated to establish operation of the machine and condition said control means for operation.

16. In a cyclically operated calculating machine having a register frame, a first and a second register carried by said frame and including ordinally arranged register units each including ordinally arranged shafts journalled in said frame, a dial and a drive gear on each said shaft, an actuating means for said product register operative in a first phase of a machine operating cycle, a tens-transfer means for said first register operative in a second phase of a machine operating cycle, a register clearing means effective selectively to clear a value from either one of said registers during the first phase of a machine operating cycle, the combination which comprises transfer means extending between corresponding orders of said registers and including ordinally arranged shafts journalled in said frame for rotational and longitudinal movement, a transfer gear on each of the two register shafts in the same order, and gears on said transfer shaft engaging the corresponding transfer gears on said register shafts with at least one of the gears on said transfer shaft movable into and out of engagement with the corresponding gear on the coordinal register shaft by longitudinal movement of the transfer shaft, control means engaging said transfer shafts for imparting longitudinal movements thereto to enable and disable said transfer means and thereby enter the value cleared from either one of said registers additively into the other of said registers when said transfer means is enabled, drive means effective to establish operating cycles of the machine, means for selectively conditioning either of said register clearing means, means operated by said drive means to operate said control means to enable said transfer means during the first phase of a machine cycle and disable said transfer means during the second phase of said cycle, a first manually operable member effective to condition said control means and said first register clearing means for operation and to operate said drive means to clear said first register, a second manually operable member effective to condition said control means and said second register clearing means for operation and operate said drive means to clear said second register, and a third manually operable member effective to condition said control means and said second register clearing means for operation and to operate said drive means to clear said second register in a first cycle of machine operation and to again condition said control means and said first register clearing means for operation and operate said drive means to clear said first register in a second cycle of machine operation.

17. In a cyclically operated calculating machine having a register frame, a first and a second register carried by said frame and including ordinally arranged register units each including ordinally arranged shafts journalled in said frame, a dial and a drive gear on each said shaft, a selection mechanism, an actuating means for entering a value standing in the selection mechanism into said first register additively or subtractively in a first phase of a machine operating cycle, a tens-transfer means for said product register operative in a second phase of a machine operating cycle, a register clearing means selectively effective to clear either one of said registers during the first phase of a machine operating cycle, a division mechanism including means for continuously subtracting a value standing in the selection mechanism from a value registered in said first register and an overdraft sensing device and means operated thereby to operate said actuating means additively to correct said overdraft, transfer means extending between corresponding orders of said registers and including ordinally arranged shafts journalled in said frame for rotational and longitudinal movement, a transfer gear on each of the two register shafts in the same order, and gears on said transfer shaft engaging the corresponding transfer gears on said register shafts with at least one of the gears on said transfer shaft movable into and out of engagement with the corresponding gear on the coordinal register shaft by longitudinal movement of the transfer shaft, control means engaging said transfer shafts for imparting longitudinal movements thereto to enable and disable said transfer means and thereby enter the value cleared from either one of said registers additively into the other of said registers when said transfer means is enabled, drive means effective to establish operating cycles of the machine, means for selectively conditioning either of said register clearing means, means operated by said drive means to operate said control means to enable said transfer means during the first phase of a machine cycle and disable said transfer means during the second phase of said cycle, a first manually operable member effective to condition said control means and said product register clearing means for operation and to operate said drive means to clear said first register, a second manually operable member effective to condition said control means and said second register clearing means for operation and to operate said drive means to clear said second register, a third manually operable member effective to condition said control means and said second register clearing means for operation and to operate said drive means to clear said counter register in a first cycle of machine operation and to again condition said control means and said first register clearing means for operation and operate said drive means to clear said first register in a second cycle of machine operation, and a fourth manually operable member effective to condition said control means and said division mechanism for operation and operate said drive means to subtract a value standing in the selection mechanism from whatever value may be in the first register while entering it additively into the second register in a first cycle of operation, means conditioned by said fourth manual member and operated by said drive means for operating said overdraft sensing device to simulate an overdraft in said first cycle and thereby operate the division mechanism to additively enter the same value from the selection mechanism into said first register without reoperating said control means.

References Cited in the file of this patent

UNITED STATES PATENTS

| | | |
|---|---|---|
| 1,921,529 | Kottmann | Aug. 8, 1933 |
| 2,173,635 | Pott | Sept. 19, 1939 |
| 2,278,863 | Chase | Apr. 7, 1942 |
| 2,342,787 | Anschutz | Feb. 29, 1944 |
| 2,389,182 | Chase | Nov. 20, 1945 |
| 2,399,170 | Chase | Apr. 30, 1946 |
| 2,656,104 | Ellerbeck | Oct. 20, 1953 |
| 2,714,989 | Ellerbeck | Aug. 9, 1955 |
| 2,722,376 | Ellerbeck | Nov. 1, 1955 |
| 2,780,411 | Kiel | Feb. 5, 1957 |

FOREIGN PATENTS

| | | |
|---|---|---|
| 736,097 | Great Britain | Aug. 31, 1955 |
| 218,923 | Switzerland | Sept. 16, 1947 |

UNITED STATES PATENT OFFICE
CERTIFICATE OF CORRECTION

Patent No. 2,928,597                                              March 15, 1960

Grant C. Ellerbeck

It is hereby certified that error appears in the printed specification of the above numbered patent requiring correction and that the said Letters Patent should read as corrected below.

Column 12, line 30, for "devision" read -- division --; column 15, line 17, for "ordinarily" read -- ordinally --; line 33, for "gear" read -- gears --; column 16, line 38, for "shafts" read -- shaft --; same line 38, for "hooks" read -- hook --; column 21, line 26, for "lef-hand" read -- left-hand --; column 22, line 62, for "springs" read -- spring --; column 23, line 37, strike out "the", second occurrence; column 24, line 72, after "third" insert a comma; column 25, line 18, for "allowing" read -- following --; line 51, for "12" read -- 112 --; column 26, line 49, for "poition" read -- position --; line 53, for "rock" read -- rocks --; column 29, line 59, for "saft" read -- shaft --; lines 68 and 69, for "suppersses" read -- suppresses --; column 35, line 27, after "latch" insert a comma; line 36, for "substraction" read -- subtraction --.

Signed and seal this 18th day of April 1961.

(SEAL)
Attest:

ERNEST W. SWIDER                                   DAVID L. LADD
Attesting Officer                                     Commissioner of Patents